US012117847B2

(12) United States Patent
Jiang et al.

(10) Patent No.: US 12,117,847 B2
(45) Date of Patent: Oct. 15, 2024

(54) TRANSFER ROBOT AND CLEANING SYSTEM

(71) Applicant: SUZHOU RADIANT PHOTOVOLTAIC TECHNOLOGY CO., LTD., Jiangsu (CN)

(72) Inventors: Changsheng Jiang, Jiangsu (CN); Jianxiang Lu, Jiangsu (CN); Xianshan Qi, Jiangsu (CN); Zhixiang Wang, Jiangsu (CN); Jianrong Xu, Jiangsu (CN); Fei Xu, Jiangsu (CN); Yu Liu, Jiangsu (CN); Xiaoli Miu, Jiangsu (CN)

(73) Assignee: SUZHOU RADIANT PHOTOVOLTAIC TECHNOLOGY CO., LTD., Jiangsu (CN)

( * ) Notice: Subject to any disclaimer, the term of this patent is extended or adjusted under 35 U.S.C. 154(b) by 793 days.

(21) Appl. No.: 17/277,419

(22) PCT Filed: Nov. 9, 2019

(86) PCT No.: PCT/CN2019/116912
§ 371 (c)(1),
(2) Date: Mar. 18, 2021

(87) PCT Pub. No.: WO2020/094143
PCT Pub. Date: May 14, 2020

(65) Prior Publication Data
US 2022/0032446 A1 Feb. 3, 2022

(30) Foreign Application Priority Data

Nov. 9, 2018 (CN) .......................... 201811333606.1
Nov. 9, 2018 (CN) .......................... 201811334457.0

(51) Int. Cl.
*G05D 1/00* (2024.01)
*B08B 13/00* (2006.01)
(Continued)

(52) U.S. Cl.
CPC .......... *G05D 1/0287* (2013.01); *B08B 13/00* (2013.01); *B25J 5/005* (2013.01); *B25J 9/1697* (2013.01);
(Continued)

(58) Field of Classification Search
CPC .. G05D 1/0287; G05D 1/0217; G05D 1/0219; G05D 1/0225; G05D 1/0234;
(Continued)

(56) References Cited

U.S. PATENT DOCUMENTS 4,792,274 A * 12/1988 Cockram ................ B60P 1/433
14/71.1
7,488,025 B1 * 2/2009 Roberson ................ B60P 1/433
296/61
(Continued)

FOREIGN PATENT DOCUMENTS

CN 103785631 A 5/2014
CN 106938269 A 7/2017
(Continued)

*Primary Examiner* — Michael Collins
(74) *Attorney, Agent, or Firm* — Rivka Friedman

(57) ABSTRACT

Disclosed are a transfer robot (300) and a cleaning system. The transfer robot (300) comprises a vehicle body (310), a transfer device (320), and an angle adjusting device (330). The cleaning system comprises a cleaning area (500), a cleaning robot (200) and the transfer robot (300). The transfer robot (300) serves as a carrying tool for the cleaning robot (200), and transfers the cleaning robot (200) to a channel area (103) among a plurality of solar panel arrays (101), such that the cleaning robot (200) can complete cleaning work on the different solar panel arrays (101).

15 Claims, 15 Drawing Sheets

(51) Int. Cl.
| | |
|---|---|
| *B25J 5/00* | (2006.01) |
| *B25J 9/16* | (2006.01) |
| *B25J 18/02* | (2006.01) |
| *B66F 9/06* | (2006.01) |
| *F24S 40/20* | (2018.01) |
| *G05D 1/247* | (2024.01) |
| *G05D 1/249* | (2024.01) |
| *G05D 1/644* | (2024.01) |
| *G05D 1/648* | (2024.01) |
| *G05D 1/661* | (2024.01) |
| *G05D 1/692* | (2024.01) |
| *G06Q 10/0631* | (2023.01) |
| *H02S 40/10* | (2014.01) |

(52) U.S. Cl.
CPC ............ *B25J 18/025* (2013.01); *B66F 9/063* (2013.01); *F24S 40/20* (2018.05); *G05D 1/0217* (2013.01); *G05D 1/0219* (2013.01); *G05D 1/0225* (2013.01); *G05D 1/0234* (2013.01); *G05D 1/0246* (2013.01); *G05D 1/247* (2024.01); *G05D 1/249* (2024.01); *G05D 1/644* (2024.01); *G05D 1/648* (2024.01); *G05D 1/661* (2024.01); *G05D 1/692* (2024.01); *G06Q 10/06313* (2013.01); *G06Q 10/06315* (2013.01); *H02S 40/10* (2014.12)

(58) Field of Classification Search
CPC ........ G05D 1/0246; H02S 40/10; F24S 40/20; B08B 13/00; B66F 9/063; G06Q 10/06313; G06Q 10/06315; B25J 5/005; B25J 9/1697; B25J 18/025
See application file for complete search history.

(56) References Cited

U.S. PATENT DOCUMENTS

| | | | |
|---|---|---|---|
| 8,146,695 B1* | 4/2012 | Ramshur | G05D 1/0265 318/587 |
| 10,858,187 B1* | 12/2020 | An | G05D 1/0255 |
| 2004/0016581 A1* | 1/2004 | Watanabe | B66F 9/141 180/168 |
| 2010/0266378 A1* | 10/2010 | Verwys | B60P 1/433 414/537 |
| 2017/0194898 A1 | 7/2017 | Meller et al. | |
| 2017/0273528 A1* | 9/2017 | Watanabe | A47L 9/2852 |
| 2019/0287063 A1* | 9/2019 | Skaaksrud | G05D 1/65 |

FOREIGN PATENT DOCUMENTS

| | | |
|---|---|---|
| CN | 107570439 A | 1/2018 |
| CN | 108712148 A | 10/2018 |
| CN | 109379037 A | 2/2019 |
| CN | 109560767 A | 4/2019 |
| CN | 209313792 U | 8/2019 |

* cited by examiner

TRANSFER ROBOT AND CLEANING SYSTEM

FIELD OF INVENTION

The present invention relates to a carrier, especially relates to a transfer robot, and a clean system including the transfer robot.

BACKGROUND OF INVENTION

As fossil fuels are declining, solar energy as a new renewable energy has become an important part of human energy use. In the past ten years, solar energy application technology has been rapidly developed in countries around the world.

Because a work environment of a solar panel can only be outdoor, the biggest issue that affects its work is not wind, rain, thunder and lightning, but the accumulated dust, snow, etc. Dust or other attachments attached to the solar panel will affect the light transmittance of the panel and hinder the photoelectric efficiency, which will seriously affect the panel's direct sunlight efficiency, reduce the panel's energy absorption and conversion efficiency, and reduce the power generation efficiency.

Therefore, every photovoltaic power station needs to clean the surface of the solar panel. Obviously, the manual cleaning efficiency is low and the risk is high. Correspondingly, the industry has developed a solar panel cleaning robot to clean the surface, which can effectively improve the cleaning efficiency without personal safety hazards caused by high-altitude cleaning operations.

SUMMARY OF INVENTION

Technical Issue

Since the placement setting of solar panel or panel array is not a one-piece setting, it is set in multiple places in a certain area, so that there is a large space between solar panels or panel arrays at different positions in the area, and cleaning robots cannot directly span these spatial intervals on different solar panels. If a cleaning robot is installed on each solar panel, not only the hardware cost is excessive high, but also the use efficiency of each cleaning robot is too low, which will result in a larger waste of resources.

Technical Solution

Based on the above problems, we need to invent a cleaning robot to complete effective cleaning work on a single solar panel or panel array. At the same time, it is needed to invent a transfer robot which can transfer the cleaning robot from one solar panel array to another solar panel array, and use the server to remotely dispatch and control the cleaning robot to efficiently complete the cleaning work on different panel arrays.

An objective of the present invention is to provide a transfer solution to solve a technical issue of transfer and dispatch of a cleaning robot among a plurality of solar panel arrays.

To achieve the above objective, the present invention provides a transfer robot comprising a vehicle body, a transfer device, and an angle adjustment device. The transfer device comprises a transfer stage rotatably connected to a top or an upper portion of the vehicle body. The angle adjustment device is disposed between the vehicle body and the transfer stage and is configured to adjust an angle of the transfer stage.

To achieve the above objective, the present invention provides another transfer robot comprising a vehicle body, a height adjustment device, transfer device, and an angle adjustment device. The height adjustment device is mounted on the top or the upper portion of the vehicle body. The transfer device comprises a transfer stage rotatably connected to a top of the height adjustment device. The angle adjustment device is disposed between the vehicle body and the transfer stage and is configured to adjust an angle of the transfer stage. To achieve the above objective, the present invention provides a clean system comprising a cleaning region, a cleaning robot and the transfer robot as described above. The cleaning region comprises a solar panel or a solar panel array. The cleaning robot in configured to perform cleaning operation in the cleaning region. The transfer robot is configured to carry the cleaning robot.

Advantages

Compared to the prior art, advantage of the present invention is that a transfer robot is provided as a carrier of a cleaning robot and the cleaning robot is transferred in a passageway region among a plurality of solar panel arrays such that the cleaning robot can accomplish cleaning work in different solar panel arrays. A tilt angle of a transfer stage of a transfer robot can be adjusted for the transfer stage fully connected to the solar panel.

DESCRIPTION OF DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may acquire other figures according to the appended figures without any creative effort.

Figure 1:
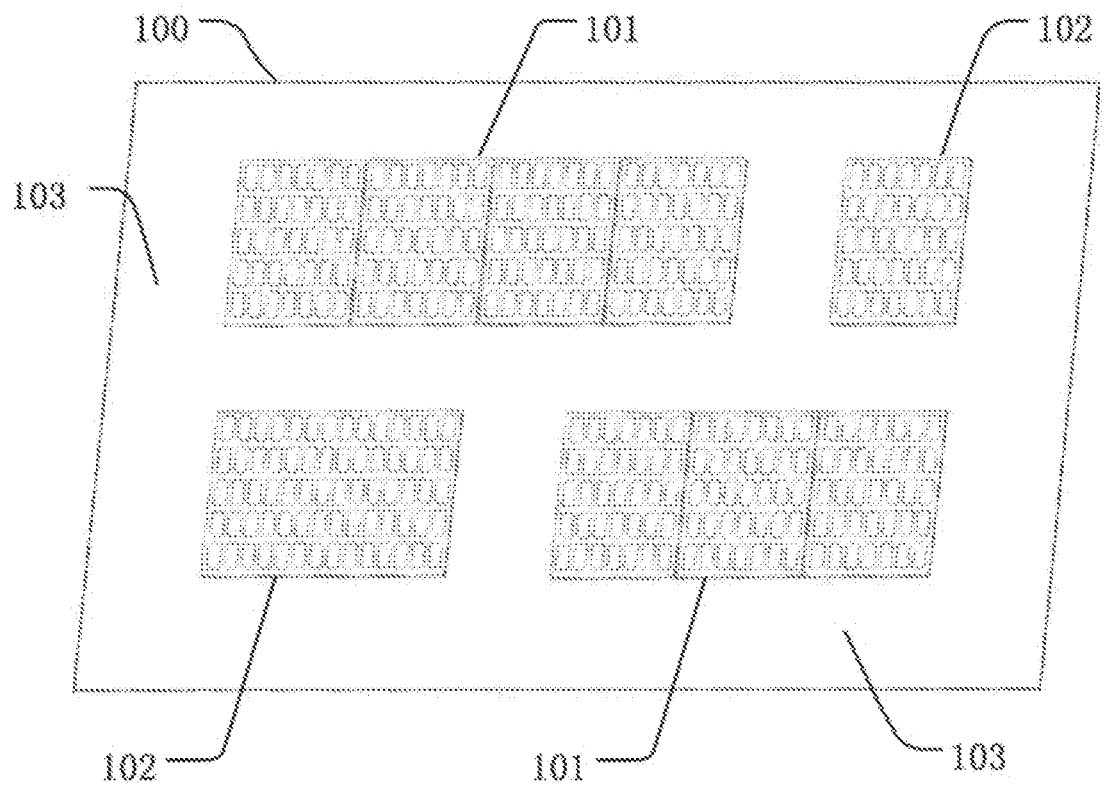
FIG. 1 is a schematic view of an operation region of a first or second embodiment of the present invention.

REFERENCE NUMBER 100 operation region, 200 cleaning robot, 300 transfer robot, 400 data process system, 500 cleaning region;
101 solar panel array, 102 solar panel, 103 passageway region;
201 first wireless communication unit, 301 second wireless communication unit, 401 third wireless communication unit;
310 vehicle body, 320 transfer device, 330 angle adjustment device, 340 processor, 350 height adjustment device;
311 vehicle body member, 312 moving device, 313 vehicle frame, 314 circuit board;
321 transfer stage, 322 baffle, 322a left baffle, 322b rear baffle, 322c right baffle, 323 entrance;
324 anti-collision member, 325a, 325b sliding shaft bases, 325c, 325d first sliding slots;
326a, 326b rotation axle bases, 326c, 326d base through holes, 327 bridge plate,
328 first telescopic rod, 329 first telescopic rod controller; 331 sliding shaft,
332 second telescopic rod, 333 rotation axle, 334 telescopic rod mounting bracket, 335 second telescopic rod controller;
351 frame, 352 first mounting bracket, 353 second mounting bracket, 354 pivot pin; 355a, 355b first rails,
356a, 356b second rails, 357a, 357b second sliding slots, 358a, 358b third sliding slots;
359 third telescopic rod, 360 third telescopic rod controller;
501 cleaning region upper end, 502 cleaning region lower end, 503 cleaning region left end, 504 cleaning region right end;
505 the first transfer region, 506 second transfer region;
601 through beam sensor, 601a transmitting end, 601b receiving end; 602 distance sensor, 603 tilt angle sensor,
604 positioning device, 605 electronic compass; 606 image sensor, 607 illumination device, 608 obstacle avoidance sensor;
3521a, 3521b first connection rods, 3522 first transverse beam, 3523a, 3523b first pulleys, 3524 sleeve;
3531a, 3531b the second connection rods, 3532 second transverse beam, 3533a, 3533b second pulleys.

DETAILED DESCRIPTION OF PREFERRED EMBODIMENTS

The preferred embodiments of the present invention are described below with reference to the accompanying drawings, which are used to exemplify the embodiments of the present invention to a person of ordinary skill in the art to make the technical contents of the present invention clearer and easy to understand. However, the present invention may be embodied in many different forms of embodiments, and the scope of the invention is not limited to the embodiments mentioned herein.

In the drawings, elements with the same structures are indicated with the same numerals, and elements with similar structures or functions are indicated with similar numerals. When an assembly are described to be "installed on" or "connected to" another assembly, both descriptions can be understood as directly "installed" or "connected", or as one assembly "installed on" or "connected to" another assembly through an intervening assembly.

With reference to FIG. 1, an operation region 100 is disposed in a solar energy power station. The operation region 100 comprises a plurality of solar panel arrays 101 (abbreviated as panel array), a tilt angle of each solar panel arrays 101 relative to a level plane is a certain angle value in a range of 15 to 45 degrees, which as much as possible guarantees greater perpendicular incidence of sunlight to the solar panel. in the most solar energy power stations, tilt angles of all solar panel relative to the level plane (abbreviated as panel tilt angle or tilt angle) are the same. In some solar energy power stations, tilt angles of solar panels would be different probably, and even tilt angles of some panels are adjustable or changeable.

With reference to FIG. 1, each solar panel arrays 101 (abbreviated as panel array) comprises spliced solar panels 102 (abbreviated as panel). A plurality of solar panel arrays 101 and/or a plurality of solar panels 102 can be arranged in an array. A passageway region 103 is defined between two adjacent solar panel arrays 101 or the solar panels 102. In the present embodiment, a plurality of intersected and connected passageway regions 103 cooperatively form a perpendicularly crisscross passageway net.

Figure 2:
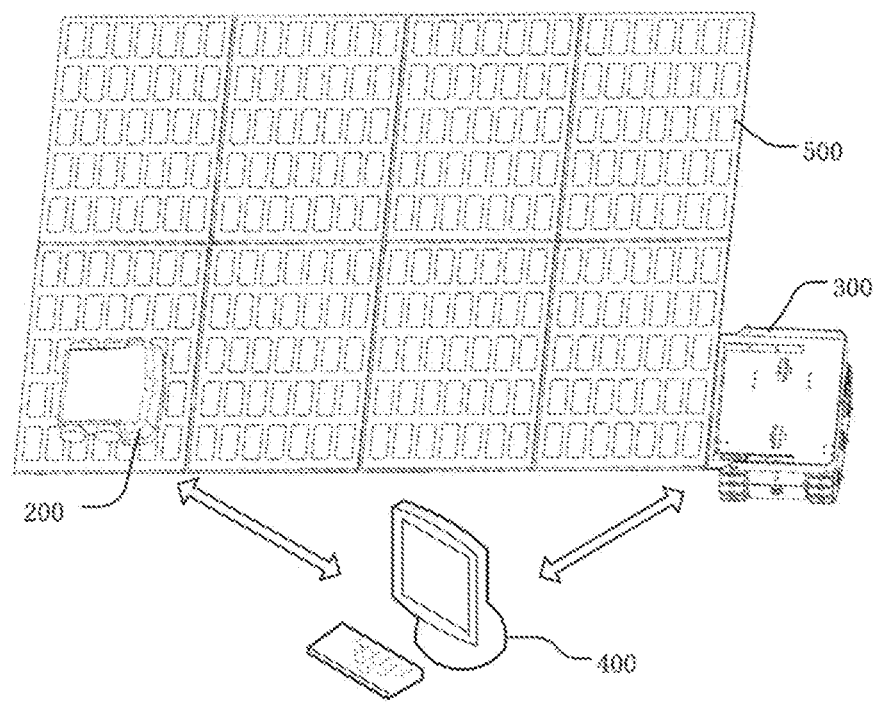
FIG. 2 is a schematic operational view of a clean system of the first or second embodiment of the present invention.
Figure 3:
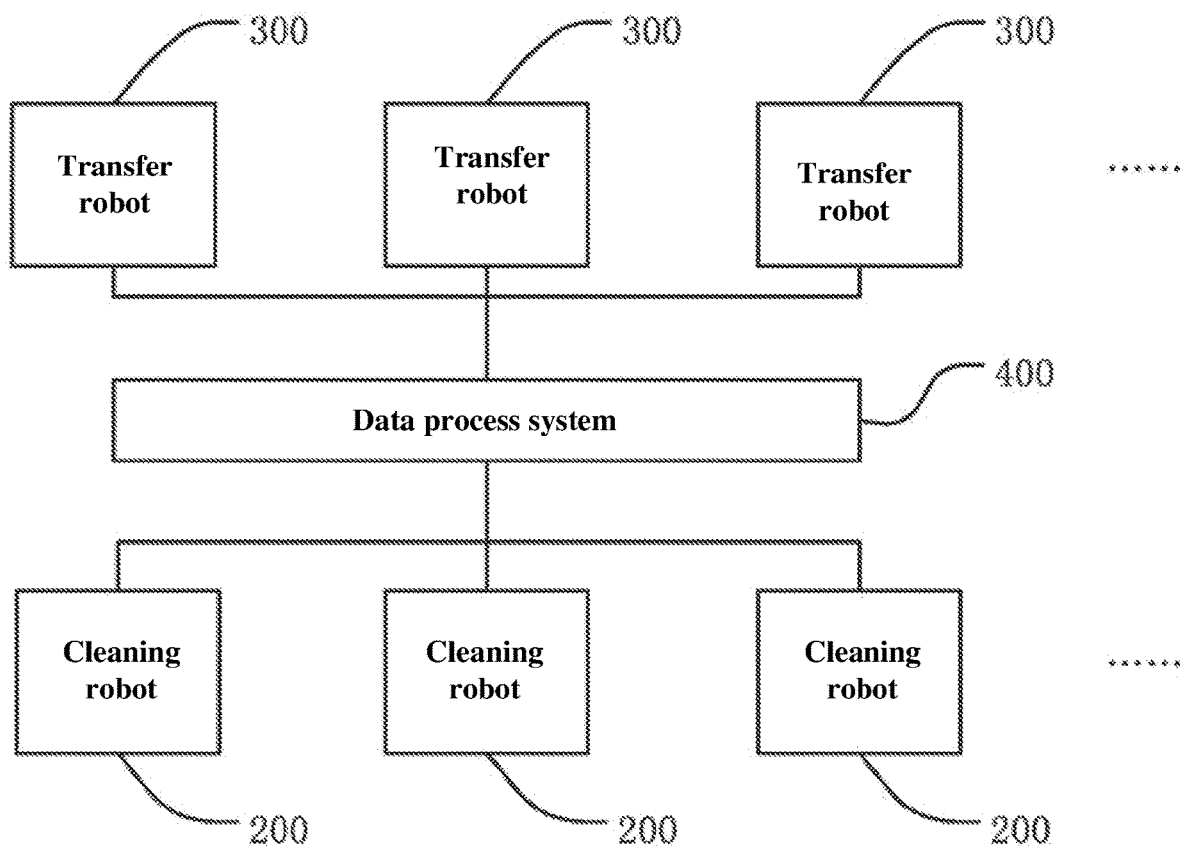
FIG. 3 is a schematic structural view of the clean system of the first or second embodiment of the present invention.

With reference to FIGS. 2 and 3, the present embodiment provides a clean system comprising a cleaning robot 200, a transfer robot 300, and a data process system 400. an operation region 100 is a work region for the cleaning robot 200 and the transfer robot 300 completing cleaning operation of the solar panel, and comprises a cleaning region 500 and a passageway region 103.

During normal operation of a solar energy power station, some solar panels or solar panel arrays would be attached with dust or stains and need to be clean. each of the solar panels 102 或 solar panel arrays 101 need to be cleaned is the cleaning region 500. The cleaning robot 100 can complete the cleaning operation on the solar panel 102 or the solar panel arrays 101 and can effectively clean each area on the panel 102 or the panel array 101. The transfer robot 300 can carry the cleaning robot 200 from a storage place of the cleaning robot 200 to an upper surface of the cleaning region 500 (panel 102 or panel array 101 needed to be cleaned), for example it is transported from an upper surface of the cleaned panel array to another cleaning region 500 (panel or panel array needed to be cleaned) upper surface, or, from an upper surface of a cleaned the cleaning region 500 to the cleaning robot 200 storage place.

Figure 4:
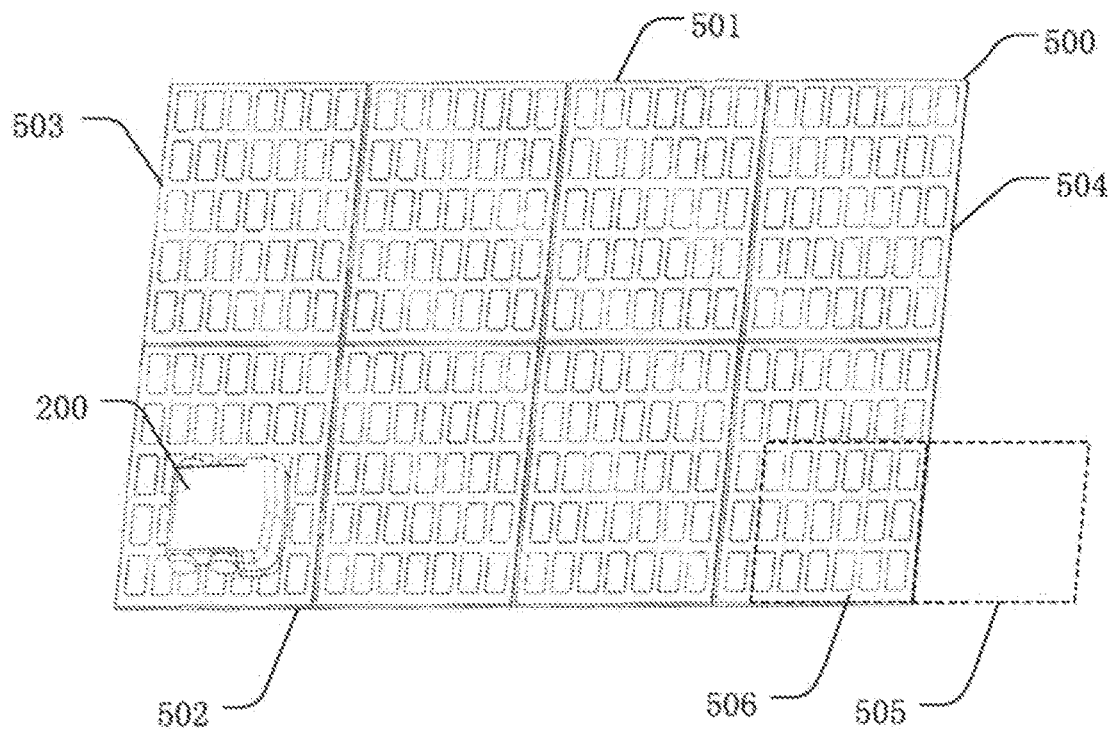
FIG. 4 is a schematic structural view of the first or second embodiment of the present invention the cleaning region.

With reference to FIG. 4, preferably, each cleaning region 500 is rectangular panel array 101, and four sides thereof have been defined as a cleaning region upper end 501, a cleaning region lower end 502, a cleaning region left end 503, and a cleaning region right end 504 respectively.

When a cleaning robot 200 is carried by the transfer robot 300 to a cleaning region 500, preferably, the cleaning robot 200 moves from the cleaning region left end 503 or cleaning region right end 504 to the cleaning region 500. Similarly, when a cleaning robot 200 is transported by the transfer robot 300 from the cleaning region 500, preferably, the cleaning robot 200 moves from the cleaning region left end 503 or cleaning region right end 504 to the transfer robot 300.

With reference to FIG. 4, each the cleaning region 500 is disposed with a first transfer region 505 and a second transfer region 506 that are disposed opposite to each other. The first transfer region 505 and the second transfer region 506 are disposed on two sides of the cleaning region left end 503 or the cleaning region right end 504 respectively. In the present embodiment, the first transfer region 505 is a region outside the cleaning region 500 abutting the cleaning region right end 504. The second transfer region 506 is a region inside the cleaning region abutting the cleaning region right end 504. Preferably, the first transfer region 505, the second transfer region 506 abuts a lower portion of the cleaning region right end 504.

Several common solutions for determining which solar panel arrays in the photovoltaic power station need to be cleaned are as follows. A first method is a zone estimation method, in a small region (a range of a region can be defined freely), natural environments where adjacent panel arrays are located are similar. Therefore, pollution degrees of the panels in the region are similar, one solar panel is randomly selected and a pollution degree thereof is inspected to determine whether the panel is required to be cleaned. When the panel needs to be cleaned, all panels in the region need to be cleaned. When operation region of a certain power station has a greater occupying area, such greater operation region can be divided into a plurality of small operation region, regions to implement a sampling inspection. A second method is a periodical cleaning method comprising periodically cleaning all of the panel arrays in the operation region according to situations of a natural environment where operation region is located. When the operation region has greater sandstorm or precipitation, a surface of the solar panel has heavier attachment, one or two times of cleaning may everyday be required. When the operation region has smaller sandstorm or precipitation, solar panel has less attachment, cleaning each few days may be required. The above two methods are both for indiscriminately processing a plurality of solar panel arrays and have low precision, and a situation that the surface of the panel with less attachment is also cleaned by the cleaning robot. A third method is respective inspection method comprising seriously inspecting the pollution degree of each panel array and determining which panel array or panel needs to be cleaned. Such method has high precision and low efficiency.

With reference to FIG. 3, the data process system 400, preferably a physical server or a cloud server, is connected to the cleaning robot 200 and/or the transfer robot 300 to achieve data exchange of the cleaning robot 200 and/or the transfer robot 300 to transmit control instructions toward the cleaning robot 200 and/or the transfer robot 300 and simultaneously obtain feedback data from the cleaning robot 200 and/or the transfer robot 300 such as real-time location coordinates of the two above robots, real-time image data of the two robots such that the data process system 400 can achieve real-time monitoring to cleaning operation of the cleaning robot 200 and movement and connection of the transfer robot 300 during and control the transfer robot 300 to move normally in the passageway net of the operation region 200, and control the transfer robot 300 to connect to the panel array 101 in the cleaning region.

The data process system 400, after obtaining a message of panel array 101 required to be cleaned (numbers of certain panels), takes account of allowable cleaning operation time in the photovoltaic power station to calculate out quantities of the transfer robots 300 and the cleaning robots 200 required for cleaning operation. The data process system 300 uses the transfer robot 300 to send the cleaning robot 200 to a certain panel array 101 that needs to be cleaned. The cleaning robot 200 implements full cleaning operation on the panel array 101. After the cleaning operation of the panel array 101 is accomplished, the data process system 400 uses the transfer robot 300 to transport the cleaning robot 200 from an upper surface of the cleaned panel array to an upper surface of another panel array that needs to be cleaned, or, to a storage place for the cleaning robot 200.

The cleaning robot 200 is applicant's self-developed products, with reference to solar panel cleaning robot related patents applications with filing dates from 2016 to 2018. The cleaning robot 200, after transported to a solar panel array, can freely move on the panel array across each corner of the panel array, and complete the entire cleaning operation to the panel array during the movement.

First Embodiment

Figure 5:
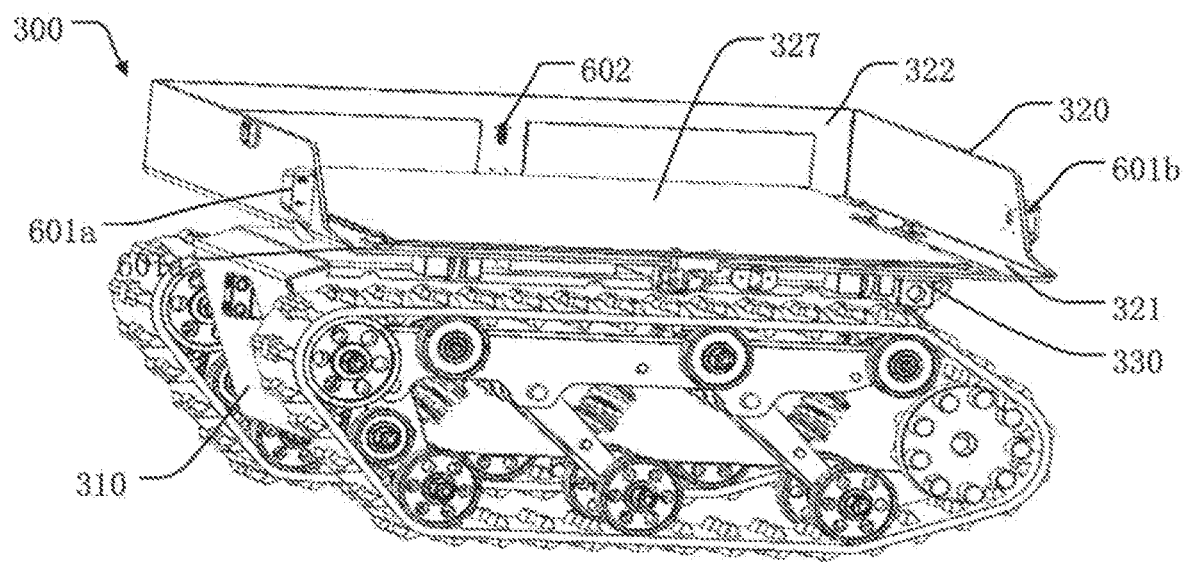
FIG. 5 is a schematic structural view of the transfer robot of the first embodiment of the present invention in a horizontal status of a transfer stage.

With reference to FIG. 5, the present embodiment provides the transfer robot 300 comprising a vehicle body 310, a transfer device 320, and an angle adjustment device 330.

Figure 6:
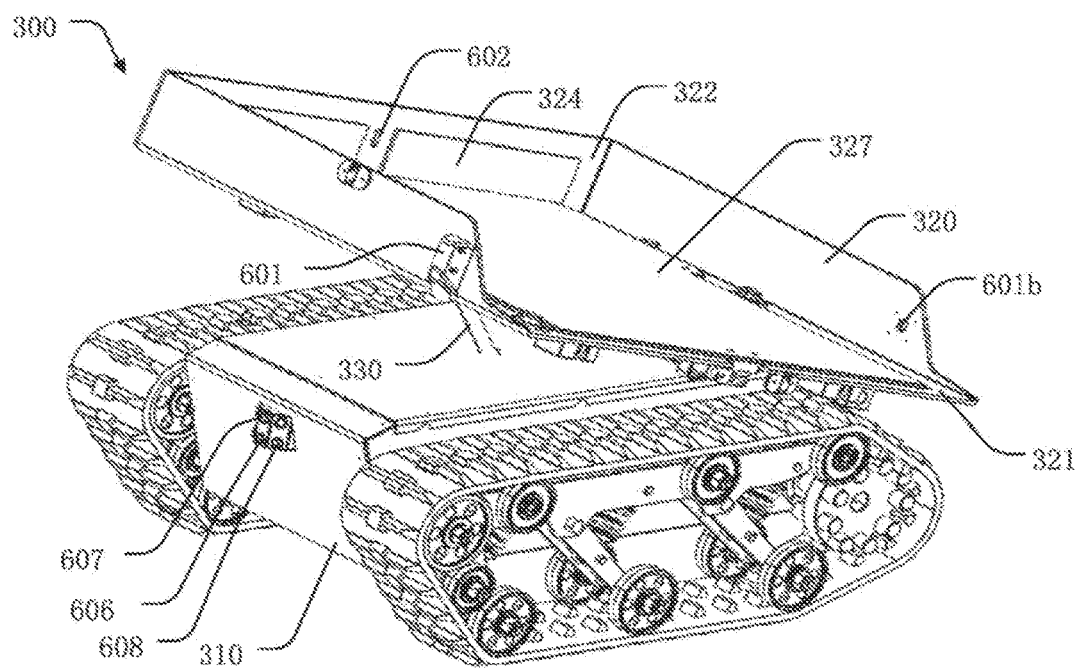
FIG. 6 is a schematic structural view of the transfer robot of the first embodiment of the present invention in a tilt status of the transfer stage.

With reference to FIGS. 5 to 6, the transfer device 320 comprises a transfer stage 321 configured to receive the cleaning robot 200. The transfer stage 321 is rotatably connected to a top or an upper half portion of the vehicle body 310. During connection, the cleaning robot 200 moves from an upper surface of the transfer stage 321 to an upper surface of a panel (on panel process), or, moves from an upper surface of the panel to the transfer stage 321 upper surface (off panel process).

Figure 7:
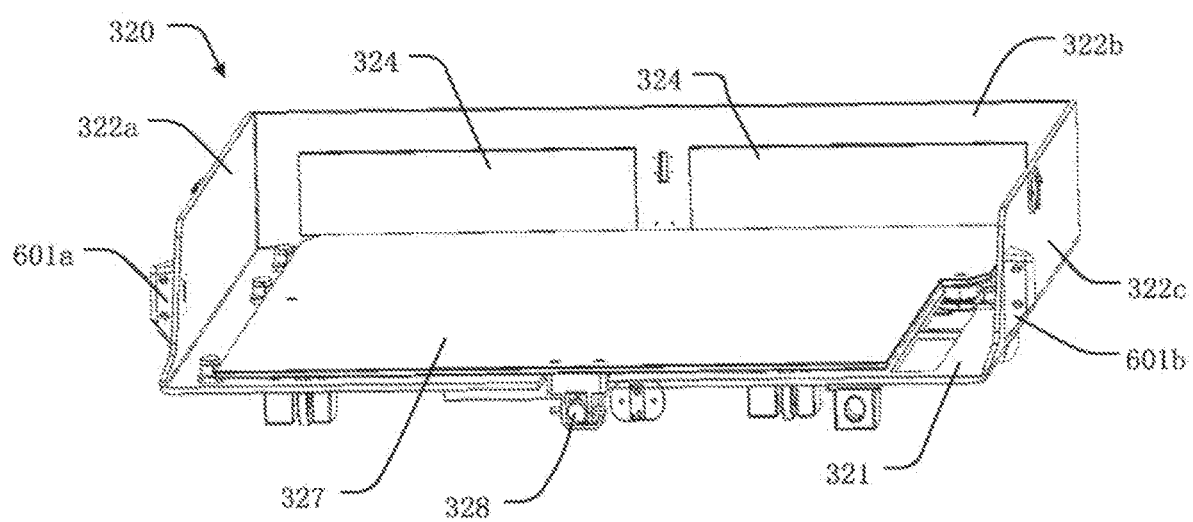
FIG. 7 is a schematic structural view of a top of the transfer device of the first embodiment of the present invention.
Figure 8:
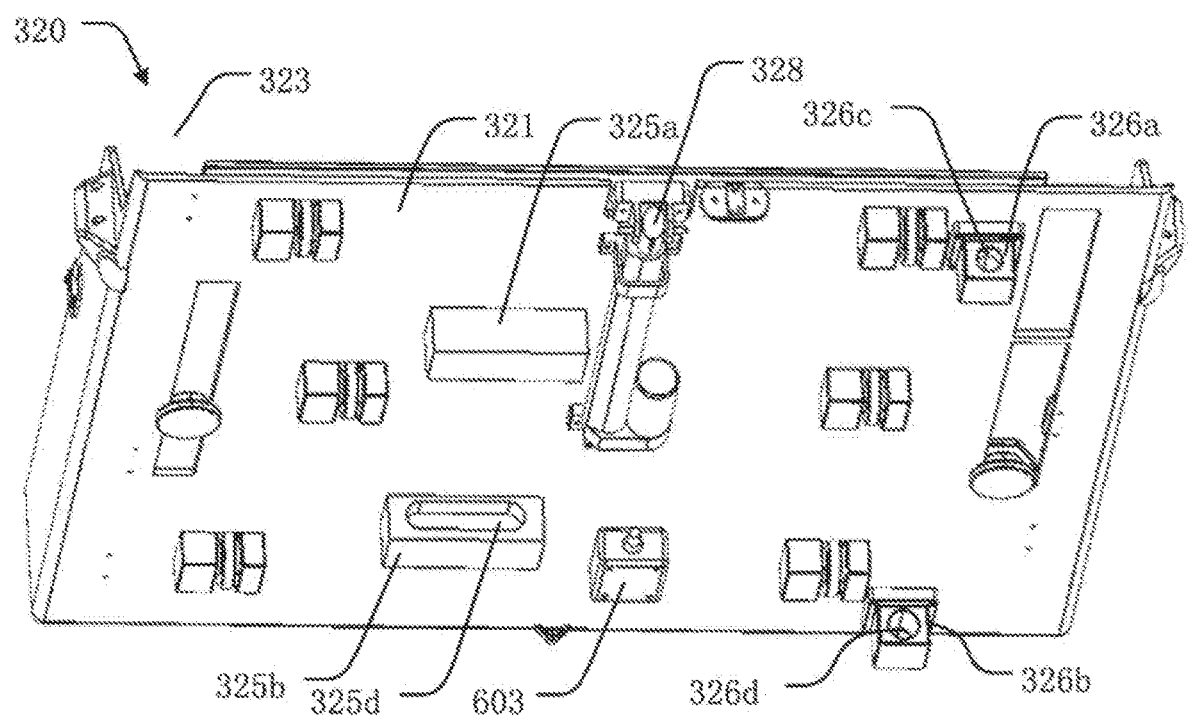
FIG. 8 is a schematic structural view of a bottom of the transfer device of the first embodiment of the present invention in a direction.
Figure 9:
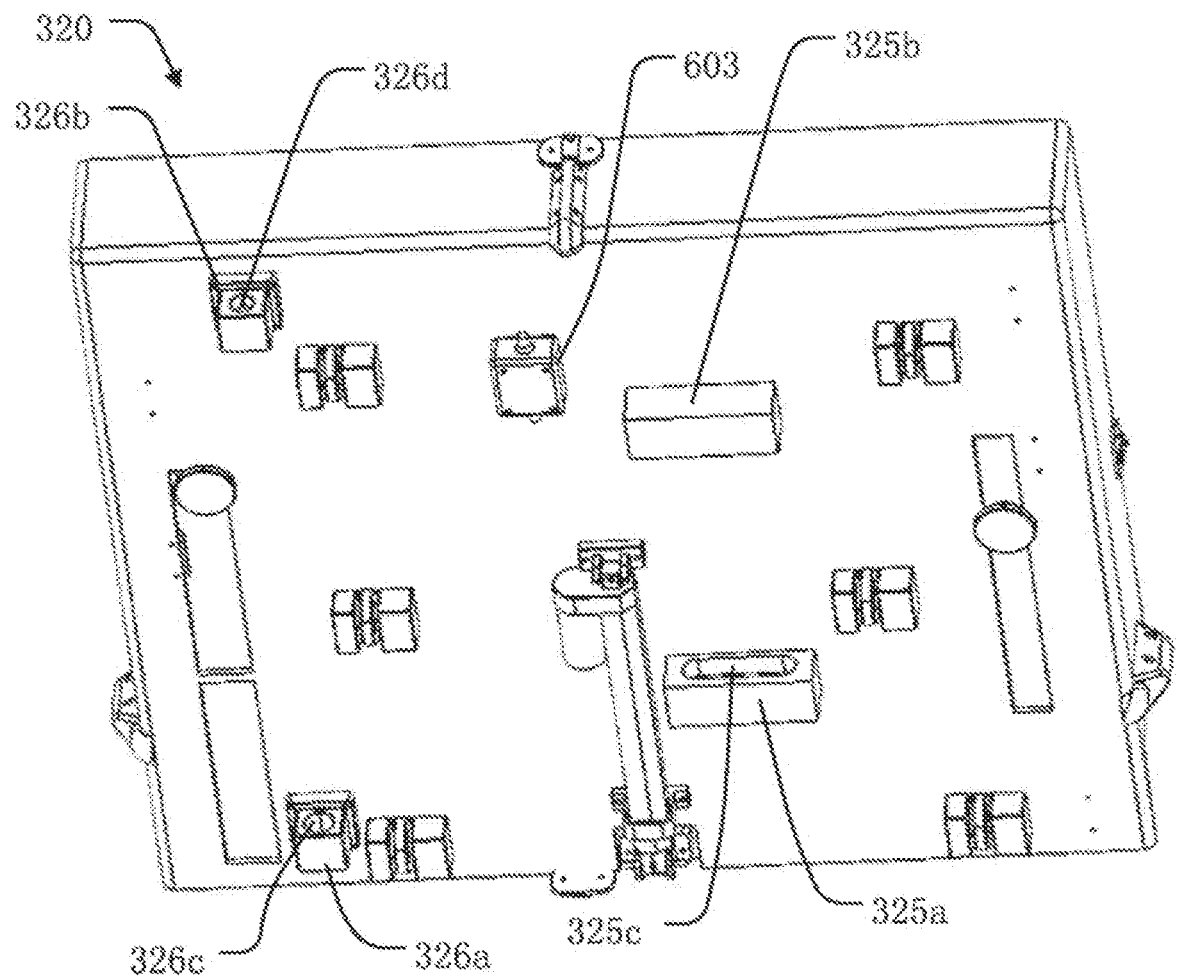
FIG. 9 is a schematic structural view of a bottom of the transfer device of the first embodiment of the present invention in another direction.

With reference to FIGS. 7 to 9, the transfer device 320 comprises a baffle 322 protruding from an edge of the transfer stage 321 and perpendicular to the transfer stage 321. The baffle 322 comprises a left baffle 322a, a rear baffle 322b, and a right baffle 322c that are sequentially connected to one another and form a U-shape; a free end of a left of the baffle 322a and a free end of a right of the baffle 322c form an entrance 323.

The transfer device 320 further comprises an anti-collision member 324 preferably an anti-collision bar, and is disposed on an inner sidewall of the rear baffle 322b. Optionally, the inner sidewall of the left baffle 322a and/or the right baffle 322c can be disposed with an anti-collision bar (not shown in figures).

The transfer device 320 further comprises a bridge plate 327 and a first telescopic rod 328. The bridge plate 327 is slidably mounted on an upper surface of the transfer stage 321. An end of the first telescopic rod 328 is connected to the transfer stage 321 lower surface, and another end of the first telescopic rod 328 is connected to a lower surface of the bridge plate 327. The first telescopic rod 328 is a hydraulic telescopic rod or an electric telescopic rod. The first telescopic rod 328 comprises a first telescopic rod controller 329. The first telescopic rod controller 329 when receiving an electric signal can control the first telescopic rod 328 to adjust a length thereof. When the length of the first telescopic rod 328 is telescoped to the shortest, the bridge plate 327 is located on the upper surface of the transfer stage 321. When a length of the first telescopic rod 328 stretches, the bridge plate 327 stretches toward the entrance 323 for a distance. When a distance between the transfer robot 300 and the panel array 101 becomes smallest and an angle of the transfer stage 321 is adjusted to be consistent with the panel array 101, the first telescopic rod 328 stretches for a certain distance and the bridge plate 327 stretches toward the solar panel arrays 101 such that the transfer stage 321 is connected to the panel array 101 and the cleaning robot 200 smoothly moves to the transfer stage 321 panel array 101 (i.e., cleaning region), or moves from the panel array 101 (i.e., cleaning region) to the transfer stage 321. After the cleaning robot 200 is transferred, the length of the first telescopic rod 328 is shortened to the shortest, the bridge plate 327 is retracted to the upper surface of the transfer stage 321.

With reference to FIGS. 7 to 9, the transfer device 320 further comprises two sliding shaft bases 325a, 325b disposed opposite to each other and two rotation axle bases 326a, 326b disposed opposite to each other.

The two sliding shaft bases 325a, 325b protrude from a middle portion of a bottom surface of the transfer stage 321. Two first sliding slots 325c, 325d are disposed on two opposite surfaces of the two sliding shaft bases 325a, 325b respectively. The two first sliding slots 325c, 325d have the same shape and size and are located oppositely.

The two rotation axle bases 326a, 326b protrude from the bottom surface of the transfer stage 321 and are located near an edge of an end of a right side of the transfer stage 321. Two base through holes 326c, 326d are defined centrally in the two rotation axle bases 326a, 326b respectively. The two base through holes 326c, 326d have the same shape and size and are located oppositely.

Figure 10:
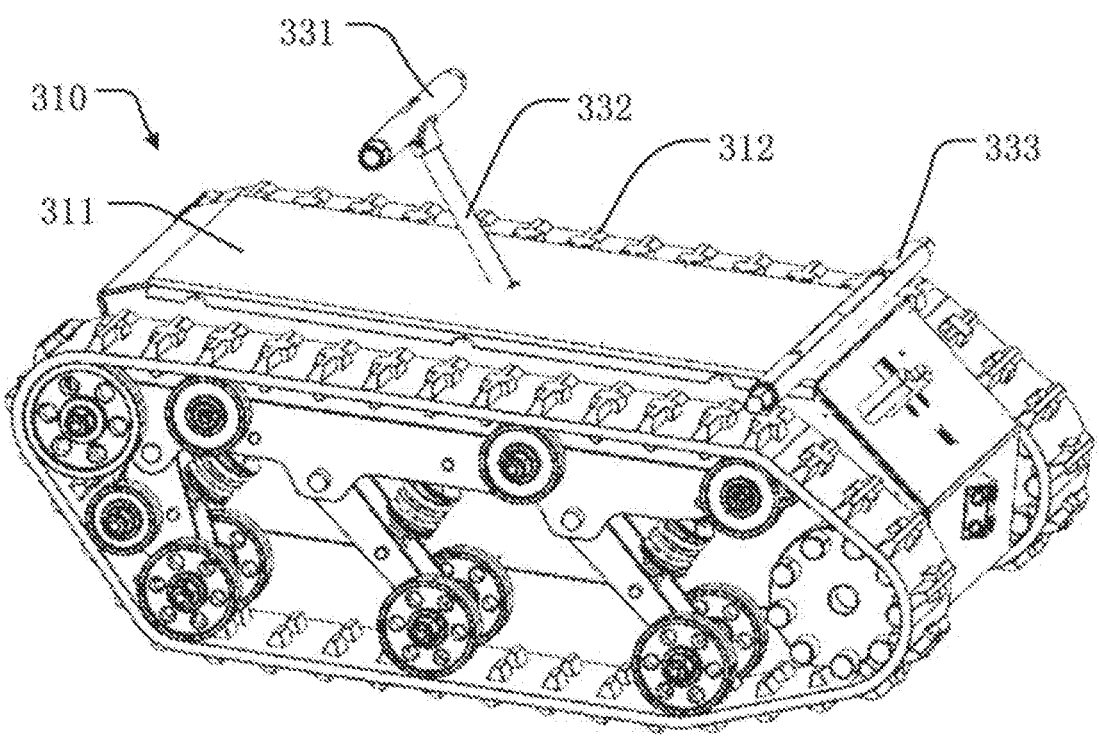
FIG. 10 is a schematic structural view of the vehicle body of the first embodiment of the present invention.

With reference to FIG. 10, the vehicle body 310 comprises a vehicle body member 311. Two moving devices 312 (for example, wheels) are disposed on left and right sides of a bottom of the vehicle body member 311, and preferably are track wheel sets having good adaptability to the road and good passing performance.

Figure 11:
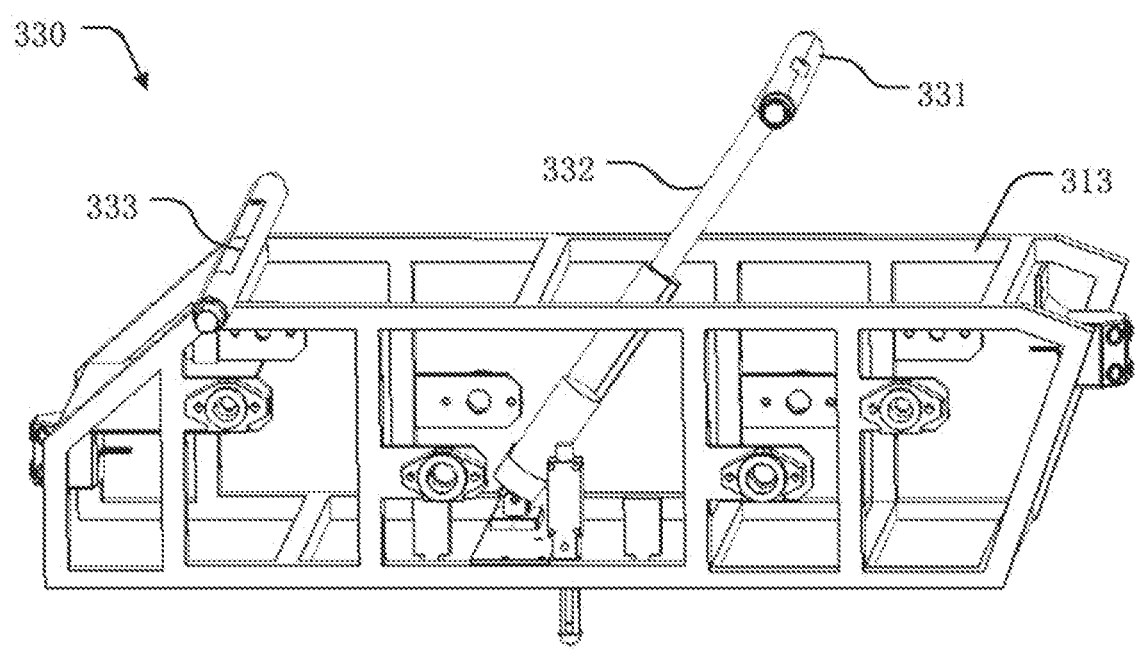
FIG. 11 is a schematic structural view of the angle adjustment device of the first embodiment of the present invention.

With reference to FIG. 11, the vehicle body member 311 comprises a vehicle frame 313, the vehicle frame 313 is a three-dimensional frame and is similar to a cuboid object as a whole. The vehicle frame 313 comprises a plurality of horizontal mounting brackets disposed horizontally and a plurality of vertical mounting brackets disposed vertically. The vertical mounting brackets are perpendicular to the level plane or has a certain included angle relative to the level plane. One or more baffles is disposed securely on a top surface, a side surface or a bottom surface of the vehicle frame 313, and the baffle and the vehicle frame 313 commonly form the vehicle body member 311.

With reference to FIGS. 5 to 6 and 10 to 11, the angle adjustment device 330 is disposed between the vehicle body 310 and the transfer stage 321 and is configured to adjust an angle of the transfer stage 321 relative to the level plane.

When the transfer robot 300 moves to a place aside the cleaning region 500, the angle adjustment device 330 adjusts the angle of the transfer stage 321 relative to the level plane such that an upper surface of the transfer stage 321 and an upper surface of the cleaning region 500 are located in the same plane as possible to facilitate connection of the transfer stage 321 with the cleaning region 500, which facilitates the cleaning robot 200 moving between the transfer stage 321 and the cleaning region 500.

With reference to FIGS. 10 to 11, the angle adjustment device 330 comprises a sliding shaft 331, a second telescopic rod 332, and a rotation axle 333. The second telescopic rod 332 is a hydraulic telescopic rod or an electric telescopic rod. The second telescopic rod 332 has a second telescopic rod controller 335. The second telescopic rod controller 335 when receiving an instruction electric signal can control the second telescopic rod 332 to adjust it's length.

Two ends of the sliding shaft 331 are slidably mounted on the two first sliding slots 325c, 325d respectively. An end of the second telescopic rod 332 is rotatably connected to the sliding shaft 331 middle portion, and another end of the second telescopic rod 332 is rotatably connected to the vehicle body 310. A middle portion of the rotation axle 333 is securely connected to an end of a top or an upper half portion of the vehicle body 310, and two ends of the rotation axle 333 are rotatably mounted on the two base through holes 326c, 326d such that the rotation axle 333 can rotate relative to the rotation axle bases 326a, 326b.

Figure 12:
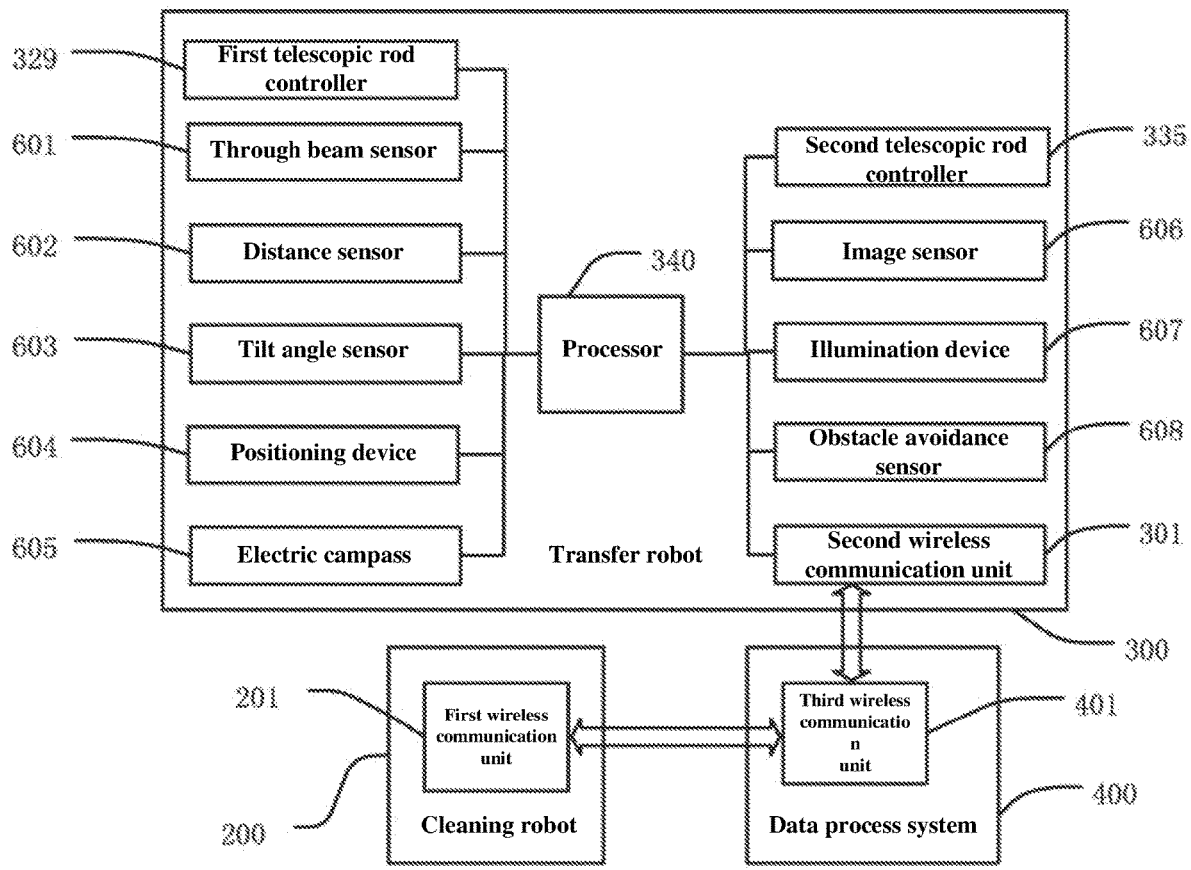
FIG. 12 is a functional module diagram of an electric device of a clean system of the first embodiment of the present invention.

With reference to FIG. 12, the present embodiment the transfer robot 300 further comprises a circuit board (not shown in figures), preferably, disposed in the vehicle body 310. A processor 340 is disposed on the circuit board as a control device of the transfer robot 300. The processor 340 is connected to the first telescopic rod controller 329 and the second telescopic rod controller 335 and is configured to transmit instructions to the first telescopic rod controller 329 and/or the second telescopic rod controller 335.

The cleaning robot 200 is disposed with a first wireless communication unit 201, the transfer robot 300 is disposed with a second wireless communication unit 301, and the data process system 400 is disposed with a third wireless communication unit 401. The first wireless communication unit 201 and the second wireless communication unit 301 are wirelessly connected to the third wireless communication unit 401 such that both the cleaning robot 200 or the transfer robot 300 can exchange data with the data process system 400 in a wireless communication manner.

With reference to FIG. 4, when the transfer robot 300 moves near the cleaning region 500 (solar panel or panel array 101), the data process system 400 controls the transfer robot 300 to adjust its location and direction to move to the first transfer region 505 of a lower end of a right side of the cleaning region 500 such that the entrance 323 of the transfer device 320 uprightly faces the cleaning region 500.

In the present embodiment, when the transfer robot 300 moves in the passageway region 103, a length of the second telescopic rod 332 is retracted to the shortest, the transfer stage 321 is disposed horizontally on a top of the vehicle body 310. An included angle between the transfer stage 321 and the vehicle body 310 upper surface is 0 degree. The cleaning robot 200 placed on the transfer stage 321 can keep stable during transport without falling off.

When the transfer robot 300 moves to the first transfer region 505 of the cleaning region 500, the processor 340 transmits an electric signal to the second telescopic rod controller 335 to control the second telescopic rod 332 to stretch. An end of the transfer stage 321 away from the rotation axle 333 is lifted, another end thereof rotates around the rotation axle 333 such that the included angle between the transfer stage 321 and the vehicle body 310 upper surface gradually increases till the tilt angle of cleaning region 500 (solar panel or panel array) relative to the level plane keeps consistent such that the upper surface of the transfer stage 321 and the panel of the upper surface of the cleaning region 500 are in the same plane. During stretching of the second telescopic rod 332, the two ends of the rotation axle 333 rotate in the two base through holes 326*c*, 326*d* respectively, the two ends of the sliding shaft 331 slide in the two first sliding slots 325*c*, 325*d* respectively such that during adjustment of the tilt angle the transfer stage 321 can keeps its bottom stable without wobble.

When tilt angles of all solar panels 102 in the operation region 100 keep the same without change, a stretching distance of the second telescopic rod 332 can be a predetermined constant length. When the second telescopic rod 332 stretches every time, the adjusted tilt angle of the transfer stage 321 is the same as the tilt angle of the panel.

When tilt angles of all solar panels in the operation region 100 are different, the data process system 400 transmits instructions to the processor 340 of the transfer robot 300 according to the tilt angles of the panels in the cleaning region 500, and the processor 340 transmits instructions to the second telescopic rod controller 335 to adjust the tilt angle of the transfer stage 321.

When adjustment of the tilt angle of the transfer stage 321 is completed, the data process system 400 receives the feedback message of the transfer robot 300 and transmits an action instruction to the cleaning robot 200 to control the cleaning robot 200 to move from the transfer stage 321 of the first transfer region 505 to the solar panel of the second transfer region 506 (abbreviated as on panel), or, move from the solar panel of the second transfer region 506 to the transfer stage 321 of the first transfer region 505 (abbreviated as off panel) to accomplish the connection.

In the present embodiment, when the transfer stage 321 is in a tilt status, a height of a lowest portion of the transfer stage 321 is greater or equal to a height of a lowest end of the solar panel or the panel array 101 in the operation region 100 (for example, lower end 502 of the cleaning region). a height of an uppermost portion of the transfer stage 321 is less or equal to a height of an uppermost end of the solar panel or the panel array 101 in the operation region 100 (for example, cleaning region upper end 501). It is guaranteed that during connection, all-round connection between the transfer stage 321 and a left side or right side of the solar panel or panel array 101 (for example, the left end 503 or right end 504 of the cleaning region).

No matter whether the transfer stage 321 is located in the tilt status or level status, the height of the lowest portion of the transfer stage 321, the height basically depends on the height of the top of the vehicle body 310. Preferably, connection position of the transfer stage 321 and the panel is located at a lower portion of a right side of the panel or the panel array 101, which has lower requirement to the height of the vehicle body 310. The lower a center of gravity of the vehicle body 310 is, the stabler the movement of the transfer robot 300 carrying the cleaning robot 200 is, which effectively prevents bump and wobble due to an uneven pavement.

In the present embodiment, the transfer robot 300 is disposed with various data obtaining devices configured to collect various work data during work of the transfer robot 300. The data obtaining device comprises different sensors comprising a through beam sensor 601, a distance sensor 602, a tilt angle sensor 603, a positioning device 604, an electronic compass 605, an image sensor 606, an illumination device 607, and an obstacle avoidance sensor 608, etc.

Each of the above sensors is wirely or wirelessly connected to the processor 340, original work data collected during operation of the transfer robot 300 is transmitted to the processor 340, becomes pre-processed data after processed by the processor 340. The original work data and/or the pre-processed data is transmitted to the data process system 400 through a wireless communication unit to achieve real-time monitoring operation process of the transfer robot 300 and real-time control to moving process and/or connection process of the transfer robot 300.

With reference to FIGS. 5 to 6 and 12, the through beam sensor 601 comprises a transmitting end 601*a* and a receiving end 601*b* disposed oppositely and are disposed on an inner sidewall of the left baffle 322*a* and an inner sidewall of the right baffle 322*c* of the transfer device 320 respectively. The transmitting end 601*a* and the receiving end 601*b* are located near the entrance 323, are disposed on two sides of the entrance 323 respectively. the through beam sensor 601 is preferably a through beam infrared sensor. Infrared ray emitted by the transmitting end 601*a* is obtained by the receiving end 601*b*. When the infrared ray is blocked, the processor 340 determines that an object passes through the entrance 323.

When a cleaning robot 200 moves from an external to an entrance of the transfer device 320, the infrared ray between the transmitting end 601*a* and the receiving end 601*b* is blocked, the through beam sensor 601 senses a front end of the cleaning robot 200 moving to the transfer device 320. When a cleaning robot 200 fully moves into an internal of the transfer device 320, infrared ray between the transmitting end 601*a* and the receiving end 601*b* becomes unblocked, the through beam sensor 601 can sense a rear end of the cleaning robot 200 moves to the transfer device 320. The processor 340 according to the real-time electric signal of the through beam sensor 601 determines a front end of a cleaning robot 200 moving to the transfer device 320 and also determines a cleaning robot 200 fully moves into the transfer device 320.

The distance sensor 602 is disposed on an inner sidewall of a middle portion of the rear baffle 322*b* of the transfer device 320 and is disposed opposite to the entrance 323. The distance sensor 602 is preferably a through beam infrared sensor, the through beam infrared sensor constantly emits infrared ray toward the entrance 323. If reflected infrared ray is received, it is determined that the cleaning robot 200 moves through the entrance 323 into the transfer stage 321. Furthermore, according to the time receiving infrared ray, a distance between the front end of the cleaning robot 200 and the rear baffle 322*b* of the transfer device 320 is obtained.

When a cleaning robot 200 moves from external to the entrance of the transfer device 320, the distance sensor 602 (reflective infrared sensor) can determine that a cleaning robot 200 moves to the transfer device 320, and can simultaneously determine a distance between the front end of the cleaning robot 200 and the rear baffle 322*b* according to the time of receiving reflected infrared ray. The processor 340 obtain a value of the distance, and is able to monitor in real-time progress of the cleaning robot 200 entering the transfer device 320 and determine whether the cleaning robot 200 completely enters the transfer stage 321.

When a cleaning robot 200 moves out of the transfer device 320 through an entrance, the distance sensor 602 (through beam infrared sensor) can determine a cleaning robot 200 moving out of the transfer device 320, and can determine a distance between the front end of the cleaning robot 200 and the rear baffle 322*b* according to the time of obtaining the reflected infrared ray. The processor 340 obtains a value of the distance and can monitor in real-time progress of the cleaning robot 200 leaving the transfer device 320 and determine whether the cleaning robot 200 completely moves out of the transfer stage 321.

The tilt angle sensor 603 is preferably disposed on a lower surface (with reference to 8) of the transfer stage 321, is configured to in real-time measure an included angle (abbreviated as stage tilt angle) between the upper surface of the transfer stage 321 and the level plane, and transmit an angle value of the stage tilt angle to the processor 340. When tilt angles of all the solar panels 102 in the operation region 100 are different or tilt angles of some panels are changeable, every time the second telescopic rod 332 stretches, the tilt angle sensor 603 in real-time monitors and transmits an angle value of the stage tilt angle to the processor 340. When an angle value of the real-time stage tilt angle is the same as the angle value of the panel tilt angle, the processor 340 transmits a stop instruction to the second telescopic rod controller 335 such that the second telescopic rod 332 stop stretching and the stage tilt angle is the same as the panel tilt angle.

In the present embodiment, the positioning device 604 is a RFID reader disposed on an internal or an external of the vehicle body 310, and is preferably disposed on the bottom of the vehicle body 310 or the front end of the transfer stage 321 and is configured to obtain a real-time location of the vehicle body 310 in the operation region and transmit a real-time location of the vehicle body 310 to the processor 340.

The present embodiment employs a label positioning solution comprising predetermining a recommended path in the passageway region 103, controlling the vehicle body 310 to move along the recommended path, setting recognizable labels at intervals in a certain distance along the recommended path, for example RFID labels, each recognizable label is stored with data such as a location coordinate if the label in the operation region. When the transfer robot 300 moves to a certain intersection or road section, the RFID reader reads a predetermined RFID label on the intersection or road section, the processor 340 obtains a real-time location of the transfer robot 300, and optionally, transmit the location to the data process system 400. In other embodiment, the positioning device 604 can also be a high precise GPS positioning unit or a Beidou positioning unit capable of obtaining a precise real-time location of the transfer robot 300.

The electronic compass 605 is preferably disposed on an internal or an external of the vehicle body 310 to obtain and transmit the real-time moving direction of the transfer robot 300 to the processor 340 for data process and data analysis to determine whether a real-time moving direction of the transfer robot 300 is consistent with the predetermined direction. If the transfer robot 300 deviates from the predetermined direction, the processor 340 transmits a control instruction to the vehicle body 310 to adjust a moving direction of the vehicle body 310 in real-time.

Preferably, the image sensor 606 and/or the illumination device 607 is disposed at a front end and/or rear end of the vehicle body 310. The image sensor 606 is configured to real-time obtain and transmit a real-time image or picture in front of and/or behind the vehicle body 310 to the processor 340. When the transfer robot 300 moves in the passageway region 103 in the operation region 100, contents of the picture obtained by the image sensor 606 comprises a moveable region in the passageway region 103 any time and is transmitted to the processor 340. The processor 340 calculates an estimated moving region covered by the vehicle body 310 in a next period according to a real-time moving speed of the vehicle body 310, and in real-time compares the estimated moving region of each time to the moveable region to determine whether the vehicle body 310 is in the moveable region in the next period. If the estimated moving region is beyond a moveable range of a zone, it is proved that an obstacle appears in the moving path of the vehicle body 310. The processor 340 needs to in real-time adjust a moving direction of the vehicle body 310 to prevent the vehicle body 310 from colliding the obstacle during movement.

In other embodiment, contents of the picture obtained by the image sensor 606 can further comprise bezels of the solar panels 102 and/or panel array 101, the bezel is shown as a bezel straight line in the picture. In other embodiment, after processed by a special algorithm, the transfer robot 300 can in real-time adjust the moving direction during moving according to a location of the bezel straight line such that the transfer robot 300 moves along the straight line as possible.

When the transfer robot 300 moves in a dark environment (for example, night or cloudy day), the illumination device 607 is configured to illuminate the passageway region in front of and/or behind the vehicle body 310 such that the image sensor 606 is able to normally obtain images and/or pictures. In other embodiment, the image sensor 606 and/or the illumination device 607 can be disposed on a left side and/or a right side of the vehicle body 310 and be configured to in real-time obtain a real-time image or picture on the left side and/or right side of the vehicle body 310. In other embodiment, the image sensor 606 and/or the illumination device 607 can be disposed on a side of the transfer device 320, a camera of the image sensor 606 faces outward. When the height and the tilt angle of the transfer stage 321 are adjusted to be consistent with those of the solar panels 102, the camera uprightly faces the solar panels 102.

The obstacle avoidance sensor 608, preferably an ultrasonic sensor, is disposed at the front end and/or rear end of the vehicle body 310. During movement of the transfer robot 300, when the processor 340 obtain a sensing signal transmitted from the obstacle avoidance sensor 608 at the front end or the rear end, it is determined that an obstacle affecting movement exists in a moving path in front of or behind the vehicle body such that the processor 340 can adjust the moving direction of the transfer robot 300 to avoid the obstacle. In other embodiment, the obstacle avoidance sensor 608 can be disposed on the left side and/or right side of the vehicle body 310.

The present embodiment provides the transfer robot 300 as a carrier of the cleaning robot 200, able to transfer the cleaning robot 200 in the passageway region 103 among solar panel arrays 101 such that the cleaning robot 200 can complete cleaning work in different solar panel arrays 101.

Second Embodiment

In the first embodiment, only one end of the transfer stage 321 of the transfer robot 300 can be lifted, and a height of another end remains unchanged. When a height of a lower end of the solar panels 102 lower end is greater than a height of a top of the vehicle body of the transfer robot 300, the transfer stage 321 cannot fully connect with the solar panels 102. Apparently, the transfer robot 300 of the first embodiment is limited and can only be adapted for a condition of the solar panels 102 with a lower height. Therefore, the present invention also provides the solar panels 102 of the second embodiment which can effectively solve the above technical issue and suitable for different heights.

Figure 13:
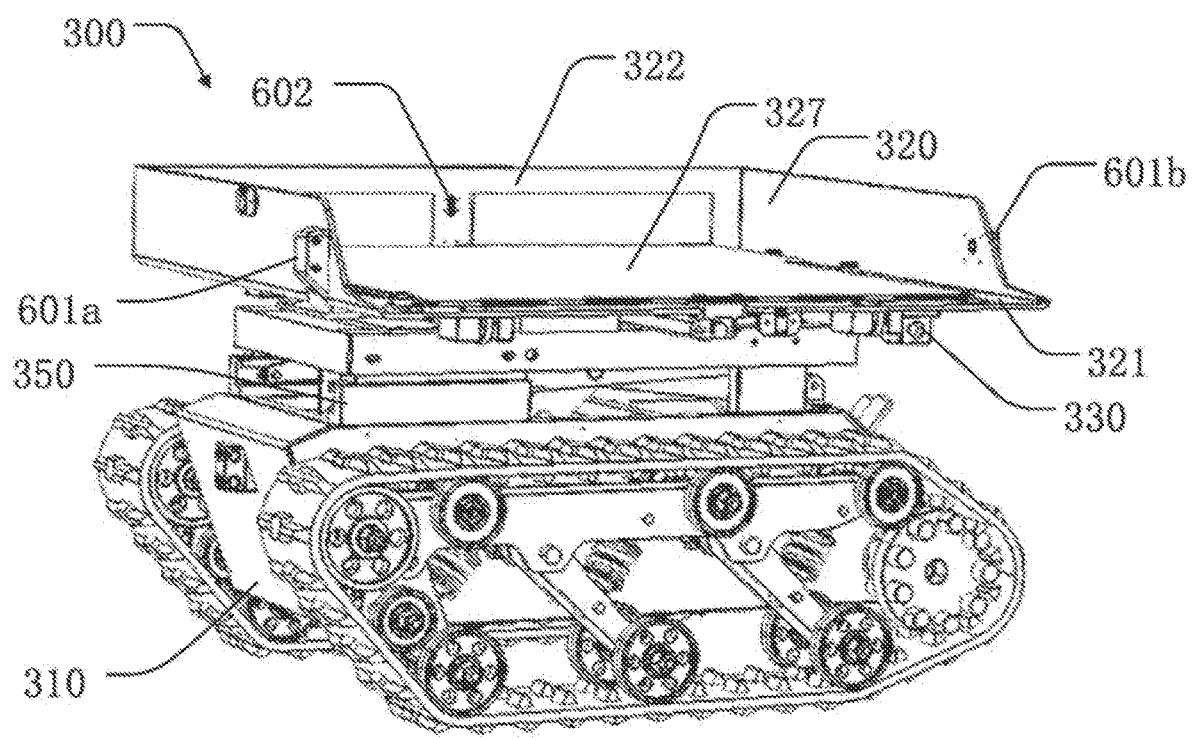
FIG. 13 is a schematic structural view of the transfer robot of the second embodiment of the present invention in a horizontal status of the transfer stage.
Figure 14:
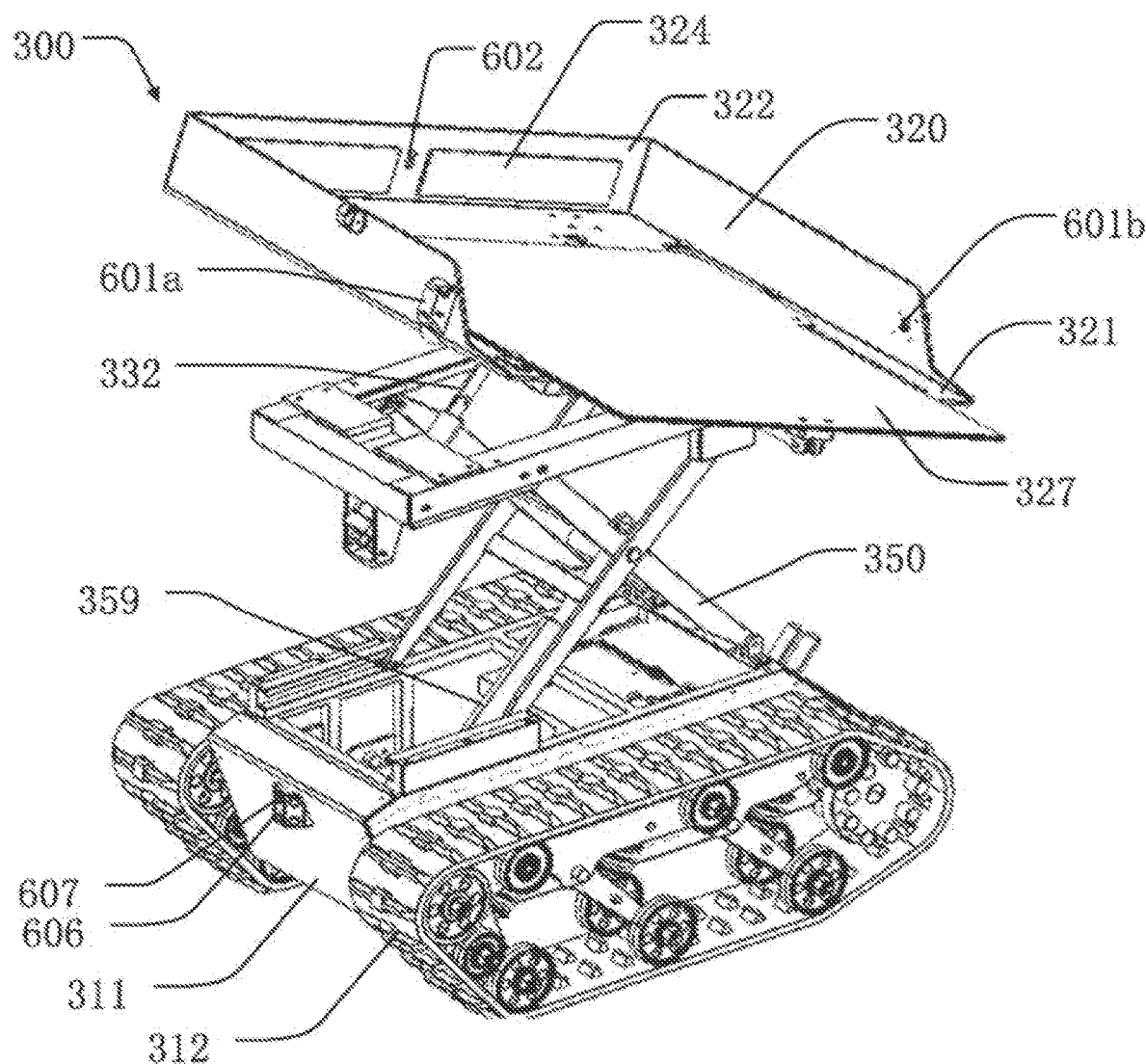
FIG. 14 is a schematic structural view of the transfer robot of the second embodiment of the present invention in a tilt status of the transfer stage.

With reference to FIGS. 13 to 14, the second embodiment comprises technical solutions of the first embodiment, and a difference is that the transfer robot 300 of the second embodiment further comprises a height adjustment device 350 disposed between the vehicle body 310 and the angle adjustment device 330. Specifically, the height adjustment device 350 is mounted on a top or an upper portion of the vehicle body 310. The transfer stage 321 of the transfer device 320 is rotatably connected to a top of the height adjustment device 350. The angle adjustment device 330 is mounted on a top of the height adjustment device 350 and a bottom of the transfer stage 321.

Figure 15:
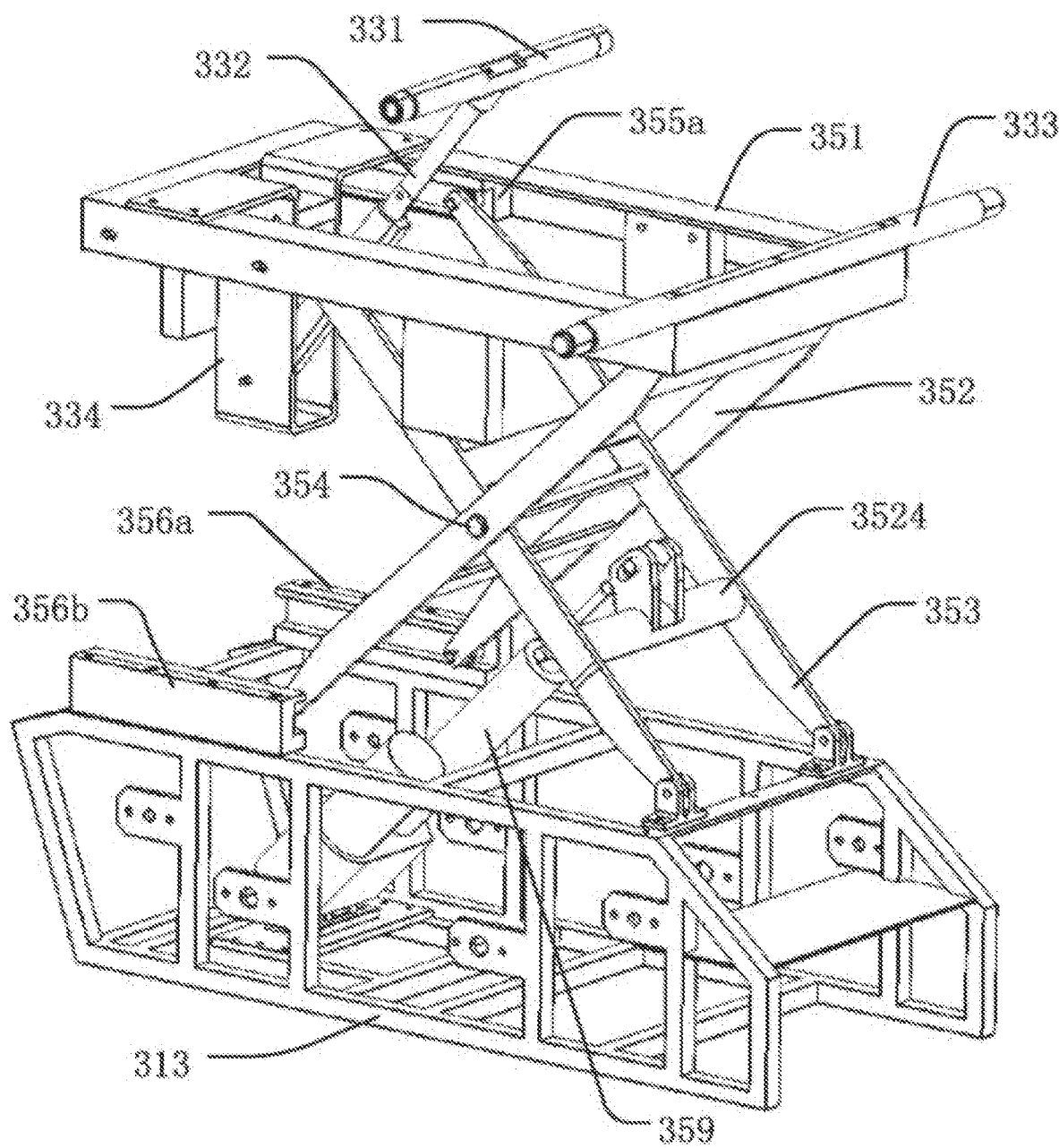
FIG. 15 is a schematic structural view of the height adjustment device of the second embodiment of the present invention in a stretched status.
Figure 16:
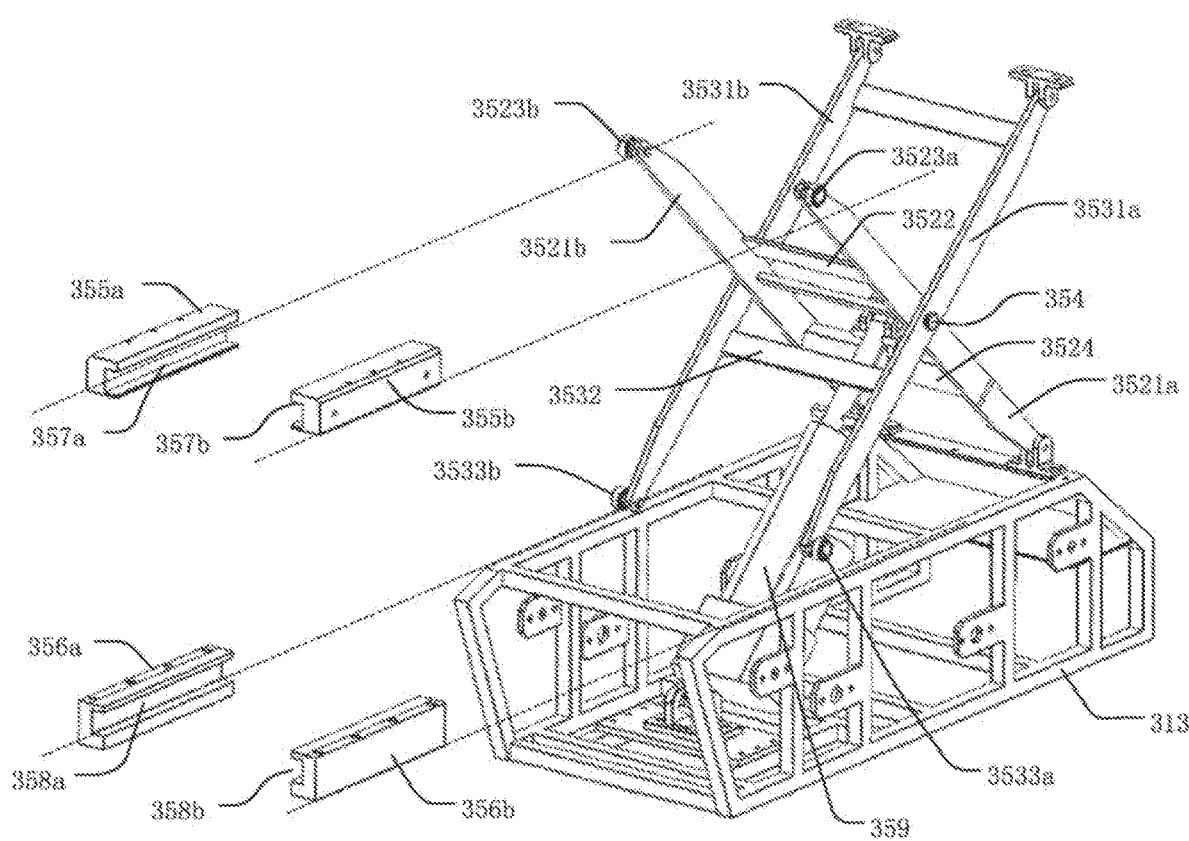
FIG. 16 is a schematic structural exploded view of the height adjustment device of the second embodiment of the present invention in a stretched status.
Figure 17:
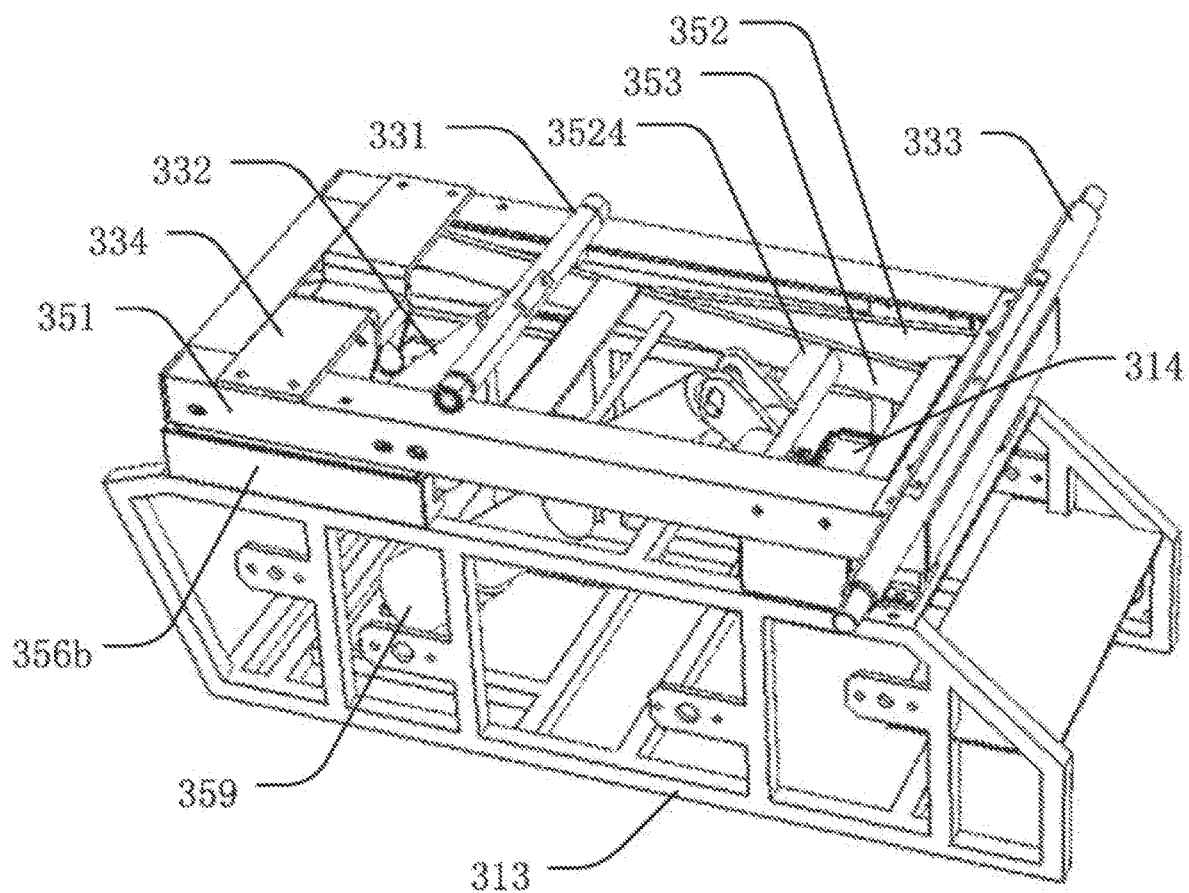
FIG. 17 is a schematic structural view of the height adjustment device of the second embodiment of the present invention in a folded status.
Figure 18:
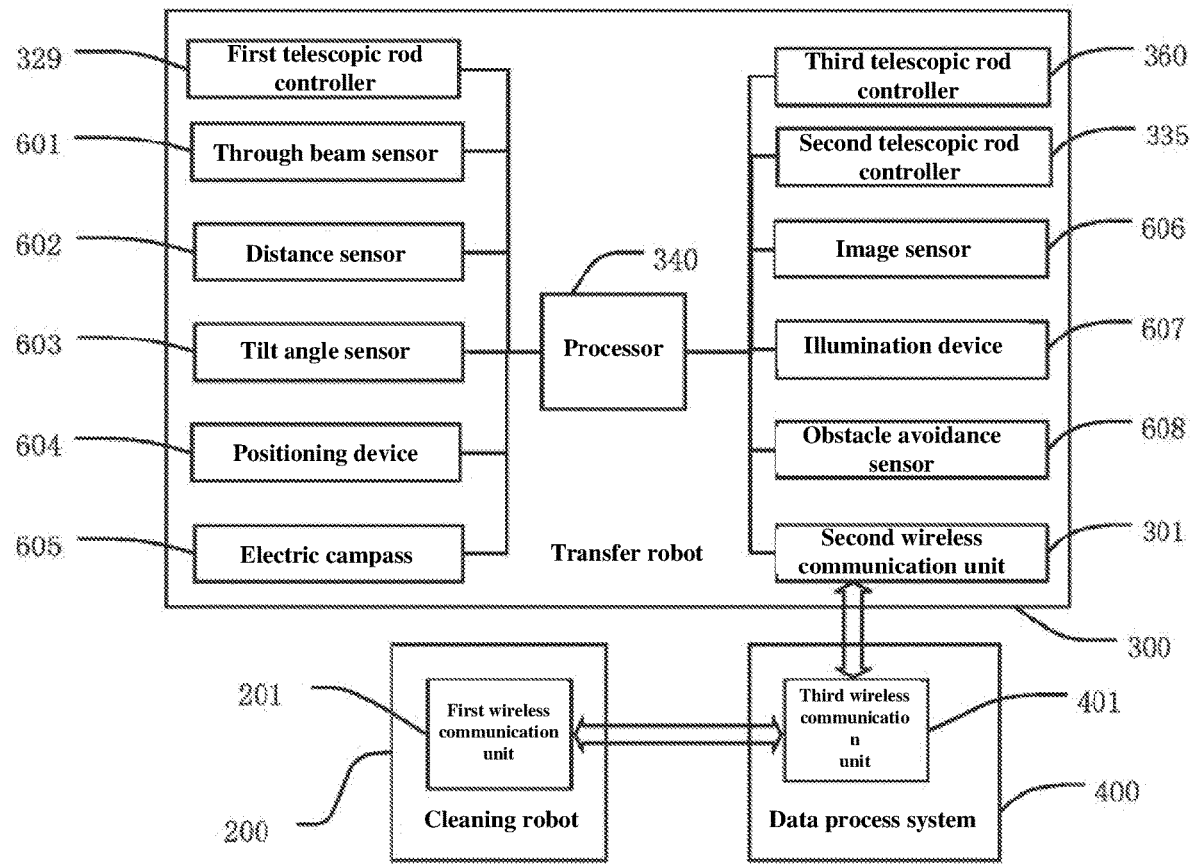
FIG. 18 is a function module diagram of an electric device of the clean system of the second embodiment of the present invention.

With reference to FIGS. 15 to 17, the height adjustment device 350 comprises a frame 351, a first mounting bracket 352, a second mounting bracket 353, and a pivot pin 354. The transfer device 320 is rotatably connected to an end of the frame 351. An upper end of the first mounting bracket 352 is slidably connected to the frame 351, and a lower end of the first mounting bracket 352 is rotatably connected to the vehicle body 310 top. An upper end of the second mounting bracket 353 is rotatably connected to the frame 351, and a lower end of the second mounting bracket 353 is slidably connected to the vehicle body 310 top. The pivot pin 354 extends through a middle portion of the first mounting bracket 352 and a middle portion of the second mounting bracket 353. The second mounting bracket 353 is rotatably connected to the first mounting bracket 352 through the pivot pin 354.

The height adjustment device 350 further comprises two first rails 355a, 355b disposed oppositely and two second rails 356a, 356b disposed oppositely. The first rails 355a, 355b are horizontally mounted on the frame 351. Two opposite second sliding slots 357a, 357b are defined in two opposite surfaces of the two first rails 355a, 355b respectively. The second rails 356a, 356b are horizontally mounted on the top or an upper portion of the vehicle body 310. Two opposite third sliding slots 358a, 358b are defined in two opposite surfaces of the two second rails 356a, 356b respectively.

With reference to FIGS. 5 to 9, structures and technical effect of the transfer device 320 of the second embodiment is the same as those in the first embodiment and will not be described herein.

With reference to FIGS. 5 to 6, the transfer device 320 comprises a transfer stage 321 configured to the cleaning robot 200, the transfer stage 321 is rotatably connected to a top or an upper half portion of the vehicle body 310. During connection, the cleaning robot 200 moves from an upper surface of the transfer stage 321 to an upper surface of the panel (on panel process), or, moves from the upper surface of the panel to the upper surface of the transfer stage 321 (off panel process).

The transfer device 320 further comprises a bridge plate 327 and a first telescopic rod 328. The bridge plate 327 is slidably mounted on an upper surface of the transfer stage 321. An end of the first telescopic rod 328 is connected to the transfer stage 321 lower surface, and another end of the first telescopic rod 328 is connected to a lower surface of the bridge plate 327. The first telescopic rod 328 is a hydraulic telescopic rod or an electric telescopic rod. The first telescopic rod 328 comprises a first telescopic rod controller 329. The first telescopic rod controller 329 when receiving an electric signal can control the first telescopic rod 328 to adjust a length thereof. When the length of the first telescopic rod 328 is telescoped to the shortest, the bridge plate 327 is located on the upper surface of the transfer stage 321. When a length of the first telescopic rod 328 stretches, the bridge plate 327 stretches toward the entrance 323 for a distance. When a distance between the transfer robot 300 and the panel array 101 becomes smallest and an angle of the transfer stage 321 is adjusted to be consistent with the panel array 101, the first telescopic rod 328 stretches for a certain distance and the bridge plate 327 stretches toward the solar panel arrays 101 such that the transfer stage 321 is connected to the panel array 101 and the cleaning robot 200 smoothly moves to the transfer stage 321 panel array 101 (i.e., cleaning region), or moves from the panel array 101 (i.e., cleaning region) to the transfer stage 321. After the cleaning robot 200 is transferred, the length of the first telescopic rod 328 is shortened to the shortest, the bridge plate 327 is retracted to the upper surface of the transfer stage 321.

With reference to FIGS. 7 to 9, the transfer device 320 further comprises two sliding shaft bases 325a, 325b disposed opposite to each other and two rotation axle bases 326a, 326b disposed opposite to each other.

The two sliding shaft bases 325a, 325b protrude from a middle portion of a bottom surface of the transfer stage 321. Two first sliding slots 325c, 325d are disposed on two opposite surfaces of the two sliding shaft bases 325a, 325b respectively. The two first sliding slots 325c, 325d have the same shape and size and are located oppositely.

The two rotation axle bases 326a, 326b protrude from the bottom surface of the transfer stage 321 and are located near an edge of an end of a right side of the transfer stage 321. Two base through holes 326c, 326d are defined centrally in the two rotation axle bases 326a, 326b respectively. The two base through holes 326c, 326d have the same shape and size and are located oppositely.

With reference to FIGS. 15 to 17, the angle adjustment device 330 comprises a sliding shaft 331, a second telescopic rod 332, a rotation axle 333, and a telescopic rod mounting bracket 334. The second telescopic rod 332 is a hydraulic telescopic rod or an electric telescopic rod. The second telescopic rod 332 comprises a second telescopic rod controller 335. The second telescopic rod controller 335 receiving an instructive electric signal can control the second telescopic rod 332 to adjust its length. Structures and technical effect of the angle adjustment device 330 are the same as those in the first embodiment and will not be described herein.

Two ends of the sliding shaft 331 are slidably mounted in the two first sliding slots 325c, 325d respectively. The telescopic rod mounting bracket 334 is disposed under the frame 351, and is connected to the frame 351. An end of the second telescopic rod 332 is rotatably connected to a middle portion of the sliding shaft 331, and another end of the second telescopic rod 332 is rotatably connected to telescopic rod mounting bracket 334. A middle portion of the rotation axle 333 is securely connected to an end of a top or an upper half portion of the frame 351 top, and two ends of the rotation axle 333 are rotatably mounted in the base through holes 326c, 326d in the two rotation axle bases 326a, 326b respectively such that the rotation axle 333 can rotate relative to the rotation axle bases 326a, 326b.

The first mounting bracket 352 comprises two first connection rods 3521a, 3521b paralleling each other and a first transverse beam 3522. Two ends of the first transverse beam 3522 are connected to the first connection rods 3521a, 3521b respectively. Two first pulleys 3523a, 3523b are disposed on outer sides of the first connection rods 3521a, 3521b upper end. The two first pulleys 3523a, 3523b are slidably mounted in the second sliding slots 357a, 357b.

The second mounting bracket 353 comprises two second connection rods 3531a, 3531b paralleling each other and a second transverse beam 3532. Two ends of the second transverse beam 3532 are connected to the second connection rods 3531*a*, 3531*b* respectively. Two second pulleys 3533*a*, 3533*b* are disposed on outer sides of the second connection rods 3531*a*, 3531*b* lower end respectively. The two second pulleys 3533*a*, 3533*b* are slidably mounted in the third sliding slots 358*a*, 358*b* respectively.

the angle adjustment device 330 further comprises a third telescopic rod 359, an end of the third telescopic rod 359 is rotatably connected to the first mounting bracket 352 or the second mounting bracket 353, and another end of the third telescopic rod 359 is rotatably connected to the vehicle body 310. Preferably, a third transverse beam (not shown in figures) is disposed on the first mounting bracket 352 and comprises two ends perpendicularly connected to the two first connection rods 3521*a*, 3521*b* respectively. A sleeve 3524 is disposed around on an external of the third transverse beam. An upper end of the third telescopic rod 359 is articulated to the sleeve 3524, and can be rotated around the third transverse beam.

The third telescopic rod 359 is a hydraulic telescopic rod or an electric telescopic rod, and is connected to the processor 340 (with reference to 18), the third telescopic rod 359 comprises a third telescopic rod controller 360. The processor 340 can transmit an electric signal to control the third telescopic rod controller 360. When the third telescopic rod controller 360 receives the electric signal, it can control the third telescopic rod 359 to adjust its length.

With reference to FIG. 3, when the transfer robot 300 moves near the cleaning region 500 (solar panel or panel array 101), the data process system 400 controls a transfer robot 300 to adjust its location and direction to move to the first transfer region 505 of a lower end of a right side of the cleaning region 500 such that the entrance 323 of the transfer device 320 uprightly faces the cleaning region 500.

In the present embodiment, the transfer robot 300 moves in the passageway region 103, lengths of the second telescopic rod 332 and the third telescopic rod 359 are retracted to the shortest, the height of the height adjustment device 350 is lowered to the lowest, the transfer stage 321 is horizontally disposed on the top of the vehicle body 310, and an included angle between the transfer stage 321 and the upper surface of the vehicle body 310 is 0 degree. The cleaning robot 200 placed on the transfer stage 321 can keep stable without falling off during transport.

With reference to FIG. 3, when the transfer robot 300 moves to the first transfer region 505 of the cleaning region 500, the processor 340 transmits an electric signal to the second telescopic rod controller 335 and/or the third telescopic rod controller 360 to control the second telescopic rod 332 and/or the third telescopic rod 359 to stretch. The third telescopic rod 359 stretches and lifts the frame 351 and the transfer stage 321 at the upper end of the height adjustment device 350. The second telescopic rod 332 stretches and lifts an end of the transfer stage 321 away from the rotation axle 333, and another end of the transfer stage 321 rotates around the rotation axle 333 such that the included angle between the transfer stage 321 and the upper surface of the vehicle body 310 gradually increases till the included angle is consistent with the tilt angle of the cleaning region 500 (solar panel or panel array) relative to the level plane. Therefore, the upper surface of the transfer stage 321 and the upper surface of the cleaning region 500 panel are in the same plane.

Similarly, after the connection process is finished, the processor 340 transmits an electric signal to the second telescopic rod controller 335 and/or the third telescopic rod controller 360 to control and shorten the second telescopic rod 332 and/or the third telescopic rod 359. The second telescopic rod 332 is shortened such that the included angle between the transfer stage 321 of the transfer device 320 relative to the level plane decreases to 0 degree, and the transfer stage 321 recovers from the tilt status to the level status. The third telescopic rod 359 is shortened such that the frame 351 and the transfer stage 321 at the upper end of the height adjustment device 350 is lowered to the lowest place, and the transfer robot 300 can move to other place.

During stretch or retraction of the second telescopic rod 332, two ends of the rotation axle 333 rotate in the two base through holes 326*c*, 326*d* respectively, and two ends of the sliding shaft 331 slide in the two first sliding slots 325*c*, 325*d* respectively such that the transfer stage 321 keeps its bottom stable without wobble during adjustment of the tilt angle.

During stretch or retraction of the third telescopic rod 359, a lower end of the first mounting bracket 352 rotates relative to the vehicle body 310, the first pulleys 3523*a*, 3523*b* on left and right sides of the upper end thereof slide in the second sliding slots 357*a*, 357*b* respectively. The upper end of the second mounting bracket 353 rotates relative to the transfer device 320, the second pulleys 3533*a*, 3533*b* at left and right sides of the lower end f the second mounting bracket 353 slide in the third sliding slots 358*a*, 358*b* respectively. The first mounting bracket 352 and the second mounting bracket 353 have substantially the same shapes and sizes. The first connection rods 3521*b* and the second connection rods 3531*b* have the same length. The first mounting bracket 352 lower end and the second mounting bracket 353 upper end have the same rotation angle. An upper end of the first mounting bracket 352 and a lower end of the second mounting bracket 353 have the same sliding distance. During ascending and descending of the height adjustment device 350, the transfer device 320 is constantly stable without wobble. When the transfer stage 321 is loaded with the cleaning robot 200, it is guaranteed that the cleaning robot 200 would not slide out of the transfer device 320.

When tilt angles of all solar panels 102 in the operation region 100 keep the same without change, a stretching distance of the second telescopic rod 332 can be a predetermined constant length. When the second telescopic rod 332 stretches every time, the adjusted tilt angle of the transfer stage 321 is the same as the tilt angle of the panel.

When heights the solar panels 102 of the operation region 100 are the same, a stretching distance of the third telescopic rod 332 can be a predetermined constant length. The stretching distance of the third telescopic rod 359 can be a predetermined constant length. Every time the third telescopic rod 359 stretches, the height raised by the transfer stage 321 are the same and is greater or equal to the height of the lower end of the panel.

When tilt angles and/or heights of all the solar panels 102 in the operation region 100 are different, the data process system 400 transmits instructions to the processor 340 of the transfer robot 300 according to heights and tilt angles of the panels in the cleaning region 500, the processor 340 transmits instructions to the third telescopic rod controller 360 to adjust the height of the height adjustment device 350 and the height of the transfer stage 321, the processor 340 transmits instructions to the second telescopic rod controller 335 to adjust the tilt angle of the transfer stage 321.

When adjustment of a tilt angle of the transfer stage 321 is completed, the data process system 400 receives a feedback message of the transfer robot 300 and transmits an action instruction to the cleaning robot 200 to control the cleaning robot 200 to moves from the transfer stage 321 of the first transfer region 505 to the solar panel of the second transfer region 506 (abbreviated as on panel), or, move from the solar panel of the second transfer region 506 to the transfer stage 321 of the first transfer region 505 (abbreviated as off panel), to complete connection process.

The transfer robot 300 of the second embodiment are disposed with various data obtaining devices, comprising a through beam sensor 601, a distance sensor 602, a tilt angle sensor 603, a positioning device 604, an electronic compass 605, an image sensor 606, an illumination device 607, and an obstacle avoidance sensor 608, etc. Structures and technical effect of the data obtaining device are the same as those in the first embodiment, and will not be described herein.

The present invention provides a transfer robot as a carrier of the cleaning robot, transferring the cleaning robot in a passageway region among a plurality of solar panel arrays such that the cleaning robot can accomplish cleaning work on different solar panel arrays. In the second embodiment, the height and tilt angle of the transfer stage of the transfer robot are adjustable. Even under circumstance of the solar panel with a greater height, the transfer stage can fully connect with the solar panel.

The above is only preferred embodiments of the present invention. It should be noted that a person of ordinary skill in the art can make several improvements and modifications without departing from the principle of the present invention. These improvements and modifications should also be considered to be within the scope of protection of the present invention.

INDUSTRIAL APPLICABILITY

The subject matter of the present invention can be manufactured and used in industries, and therefore has industrial applicability.

What is claimed is:

1. A transfer robot, comprising:
a vehicle body;
a transfer device, comprising a transfer stage and a baffle protruding from an edge of the transfer stage, wherein the baffle comprises a left baffle, a rear baffle, and a right baffle that are sequentially connected to one another, and an entrance is defined between a free end of the left baffle and a free end of the right baffle; and
an angle adjustment device disposed between the vehicle body and the transfer stage, and configured to adjust an angle of the transfer stage;
wherein the transfer device further comprises:
a through beam sensor comprising a transmitting end and a receiving end that are disposed oppositely, wherein the transmitting end and the receiving end are disposed on an inner sidewall of the left baffle and an inner sidewall of the right baffle respectively, and the transmitting end and the receiving end are located near the entrance; and/or
a distance sensor disposed on an inner sidewall of a middle portion of the rear baffle and disposed opposite to the entrance;
wherein the through beam sensor and/or the distance sensor is connected to a processor.

2. The transfer robot as claimed in claim 1, wherein the transfer device further comprises:
an anti-collision member disposed on the inner sidewall of the left baffle and/or the rear baffle and/or the right baffle.

3. The transfer robot as claimed in claim 1, wherein the transfer device comprises:
a bridge plate slidably mounted on an upper surface of the transfer stage; and
a first telescopic rod comprising an end connected to a lower surface of the transfer stage and another end connected to a lower surface of the bridge plate.

4. The transfer robot as claimed in claim 1, wherein the transfer stage is rotatably connected to a top or an upper portion of the vehicle body.

5. The transfer robot as claimed in claim 4, wherein the transfer device comprises:
two sliding shaft bases disposed oppositely and protruding from a middle portion of a bottom surface of the transfer stage;
two first sliding slots disposed on two opposite surfaces of the two sliding shaft bases respectively; and
two rotation axle bases disposed oppositely, protruding from the bottom surface of the transfer stage, and located near an edge of an end of the transfer stage;
the angle adjustment device comprises:
a sliding shaft comprising two ends slidably mounted in the two first sliding slots respectively;
a second telescopic rod comprising an end rotatably connected to a middle portion of the sliding shaft and another end rotatably connected to the vehicle body; and
a rotation axle comprising a middle portion connected to an end of the top or the upper portion of the vehicle body and two ends rotatably mounted on the two rotation axle bases respectively.

6. The transfer robot as claimed in claim 1, wherein the transfer robot further comprises:
a tilt angle sensor configured to measure an included angle between the transfer stage and a level plane;
the tilt angle sensor disposed on the transfer stage lower surface and connected to a processor.

7. The transfer robot as claimed in claim 1, wherein the transfer robot further comprises:
a positioning device configured to obtain a real-time location of the vehicle body;
the positioning device disposed on an internal or an external of the vehicle body and connected to a processor.

8. The transfer robot as claimed in claim 1, wherein the transfer robot further comprises:
an electronic compass configured to obtain a real-time moving direction of the vehicle body;
the electronic compass disposed on an internal or an external of the vehicle body and connected to a processor.

9. The transfer robot as claimed in claim 1, wherein the transfer robot further comprises:
an image sensor disposed on a front end and/or a rear end and/or a left side and/or a right side of the vehicle body and connected to a processor; and/or,
an illumination device disposed on the front end and/or the rear end and/or the left side and/or the right side of the vehicle body and connected to a processor.

10. The transfer robot as claimed in claim 1, wherein the transfer robot further comprises:
an obstacle avoidance sensor disposed on a front end and/or a rear end and/or a left side and/or a right side of the vehicle body and connected to a processor.

11. A transfer robot, comprising:
a vehicle body;
a transfer device, comprising a transfer stage;

an angle adjustment device disposed between the vehicle body and the transfer stage, and configured to adjust an angle of the transfer stage;

a height adjustment device mounted on a top or an upper portion of the vehicle body;

wherein the transfer stage is rotatably connected to a top of the height adjustment device, and the height adjustment device comprises:

a frame, wherein the transfer device is rotatably connected to an end of the frame;

a first mounting bracket comprising an upper end slidably connected to the frame and a lower end rotatably connected to a top or an upper half portion of the vehicle body;

a second mounting bracket comprising an upper end rotatably connected to the frame and a lower end slidably connected to the top or the upper half portion of the vehicle body; and a pivot pin extending through a middle portion of the first mounting bracket and a middle portion of the second mounting bracket, wherein the second mounting bracket is rotatably connected to the first mounting bracket through the pivot pin.

12. The transfer robot as claimed in claim 11, wherein the transfer device comprises:

two sliding shaft bases disposed oppositely and protruding from a middle portion of a bottom surface of the transfer stage;

two first sliding slots disposed on two opposite surfaces of the two sliding shaft bases respectively; and two rotation axle bases disposed oppositely, protruding from the bottom surface of the transfer stage, and located near an edge of an end of the transfer stage;

the angle adjustment device comprises:

a sliding shaft comprising two ends slidably mounted in the two first sliding slots respectively;

a telescopic rod mounting bracket disposed below the frame and connected to the frame;

a second telescopic rod comprising an end rotatably connected to a middle portion of the sliding shaft and another end rotatably connected to the telescopic rod mounting bracket; and a rotation axle comprising a middle portion connected to an end of a top of the frame and two ends rotatably mounted on the two rotation axle bases respectively.

13. The transfer robot as claimed in claim 11, wherein the height adjustment device comprises:

two first rails that are disposed oppositely mounted on the frame;

two second rails that are disposed oppositely mounted on a top or an upper half portion of the vehicle body;

two second sliding slots disposed on two opposite surfaces of the two first rails respectively; and two third sliding slots disposed on two opposite surfaces of the two second rails respectively;

the first mounting bracket comprises:

two first connection rods paralleling each other; and two first pulleys disposed on ends of the two first connection rods respectively and slidably mounted in the two second sliding slots respectively;

the second mounting bracket comprises:

two the second connection rods paralleling each other; and two second pulleys disposed on ends of the two the second connection rods respectively and slidably mounted in the two third sliding slots respectively.

14. The transfer robot as claimed in claim 11, wherein the height adjustment device further comprises:

a third telescopic rod comprising an end rotatably connected to the first mounting bracket or the second mounting bracket and another end rotatably connected to the vehicle body.

15. A transfer robot, comprising:

a vehicle body;

a transfer device, comprising a transfer stage;

an angle adjustment device disposed between the vehicle body and the transfer stage, and configured to adjust an angle of the transfer stage;

a first telescopic rod controller configured to adjust a length of a first telescopic rod; and/or, a second telescopic rod controller configured to adjust a length of a second telescopic rod; and/or, a third telescopic rod controller configured to adjust a length of a third telescopic rod; and a processor connected to the first telescopic rod controller and/or the second telescopic rod controller and/or the third telescopic rod controller.

* * * * *